(12) United States Patent
Perkins et al.

(10) Patent No.: US 10,806,648 B2
(45) Date of Patent: Oct. 20, 2020

(54) RAMP ASSEMBLY WITH COLLAPSIBLE SIDE RAILS FOR MOTORIZED VEHICLE

(71) Applicant: The Braun Corporation, Winamac, IN (US)

(72) Inventors: Greg Perkins, Winamac, IN (US); Michael Laird, Logansport, IN (US); Eric Kitchel, Logansport, IN (US)

(73) Assignee: THE BRAUN CORPORATION, Winamac, IN (US)

( * ) Notice: Subject to any disclaimer, the term of this patent is extended or adjusted under 35 U.S.C. 154(b) by 0 days.

(21) Appl. No.: 16/272,011

(22) Filed: Feb. 11, 2019

(65) Prior Publication Data

US 2019/0247248 A1 Aug. 15, 2019

Related U.S. Application Data

(60) Provisional application No. 62/629,998, filed on Feb. 13, 2018.

(51) Int. Cl.
*A61G 3/06* (2006.01)

(52) U.S. Cl.
CPC ............. *A61G 3/061* (2013.01); *A61G 3/067* (2016.11)

(58) Field of Classification Search
CPC . A61G 3/061; A61G 3/067; B60P 1/43; B60P 1/431; B60P 1/433
See application file for complete search history.

(56) References Cited

U.S. PATENT DOCUMENTS

| | | |
|---|---|---|
| 6,095,747 A | 8/2000 | Cohn |
| 8,167,093 B2 | 5/2012 | Song et al. |
| 2004/0013507 A1 | 1/2004 | Kiser |
| 2004/0146385 A1 | 7/2004 | Edwards et al. |
| 2011/0008140 A1* | 1/2011 | Hansen ................ A61G 3/061 414/523 |
| 2011/0146008 A1* | 6/2011 | Hansen ................ A61G 3/061 14/71.1 |
| 2016/0152170 A1* | 6/2016 | Kiyak .................. A61G 3/061 414/522 |

FOREIGN PATENT DOCUMENTS

KR 100345927 B1 7/2002

OTHER PUBLICATIONS

International Search Report & Written Opinion, Korean Intellectual Property Office, dated May 27, 2019, International Application Ser. No. PCT/US2019/017410.

* cited by examiner

*Primary Examiner* — Glenn F Myers
(74) *Attorney, Agent, or Firm* — Taft Stettinius & Hollister LLP; Stephen F. Rost

(57) ABSTRACT

A ramp assembly for use to accommodate a wheel-chaired passenger to enter or exit a motorized vehicle includes a ramp body having a length defined along a longitudinal direction, a first side rail pivotably coupled to the ramp body, a second side rail pivotably coupled to the ramp body, and a hinge plate pivotably coupled to the ramp body. The ramp assembly further includes a first arm and a second arm coupled to a bottom surface of the ramp body. The first side rail and second side rail are pivotably moved between a folded position in which the first and second side rails pivot inwardly and a raised position in which the side rails are oriented perpendicular to the ramp body. The first arm operably pivots the first side rail between its folded and raised position, and the second arm operably pivots the second side rail between its folded and raised position.

19 Claims, 23 Drawing Sheets

RAMP ASSEMBLY WITH COLLAPSIBLE SIDE RAILS FOR MOTORIZED VEHICLE

RELATED APPLICATIONS

This application claims the benefit of U.S. Provisional Patent Application Ser. No. 62/629,998, filed Feb. 13, 2018, the disclosure of which is hereby incorporated by reference in its entirety.

FIELD OF THE DISCLOSURE

The present application relates to a passenger vehicle for transporting one or more passengers, and more particularly to a ramp assembly with side rails for accommodating ingress and egress of a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van or bus is retrofitted with a ramp to enable a physically limited individual using a wheelchair to enter and exit the vehicle without the assistance of another individual.

Other known products for retrofitting a vehicle, such as a van, bus, sport-utility vehicle, or motor coach, include wheel chair lifts, lift platforms, and lowered floor surfaces. In some instances, a floor of an original equipment manufacturer (OEM) vehicle is lowered or otherwise modified to accommodate an entry and exit of the physically limited individual through a side door or entrance of the vehicle. Once inside the vehicle, an individual who uses the assisted entrance is located in a rear passenger compartment of the vehicle adjacent to or behind the side entrance.

SUMMARY

In a first embodiment of this disclosure, a ramp assembly for use to accommodate a wheel-chaired passenger to enter or exit a motorized vehicle includes a ramp body having a length defined along a longitudinal direction; a first side rail pivotably coupled to the ramp body along a first side; a second side rail pivotably coupled to the ramp body along a second side; a hinge plate pivotably coupled to the ramp body at a first end; a first cam arm coupled to a bottom surface of the ramp body, the first cam arm including a first cam wheel; and a second cam arm coupled to the bottom surface of the ramp body, the second cam arm including a second cam wheel; wherein, the first side rail and second side rail are pivotably moved between a folded position in which the side rails pivot inwardly and a raised position in which the side rails are oriented perpendicular to the ramp body; further wherein, the first cam arm operably pivots the first side rail between its folded and raised position, and the second cam arm operably pivots the second side rail between its folded and raised position.

In a second embodiment of the present disclosure, a ramp assembly for use to accommodate a wheel-chaired passenger to enter or exit a motorized vehicle, includes a ramp body; a first side rail pivotably coupled to the ramp body along a first side; a second side rail pivotably coupled to the ramp body along a second side; and a manual deployment device coupled to the ramp body, the manual deployment device comprising a coupler end for coupling to the ramp body, a flexible cable, an outer tube surrounding the cable, and a handle for maneuvering the ramp body; wherein, the first side rail and second side rail are pivotably moved between a folded position in which the side rails pivot inwardly and a raised position in which the side rails are oriented perpendicular to the ramp body.

In one example of this embodiment, the ramp assembly includes a first cam arm coupled to a bottom surface of the ramp body, the first cam arm including a first cam wheel; and a second cam arm coupled to the bottom surface of the ramp body, the second cam arm including a second cam wheel; wherein, the first cam arm operably pivots the first side rail between its folded and raised position, and the second cam arm operably pivots the second side rail between its folded and raised position.

In a further embodiment of the present disclosure, a motorized vehicle includes a chassis; a floor structure formed in the chassis, the floor structure defining an inner compartment; a ramp assembly movable between a stowed position in which the ramp assembly is disposed in the compartment and a deployed position, the ramp assembly comprising a ramp body, a first side rail pivotably coupled to the ramp body along a first side, a second side rail pivotably coupled to the ramp body along a second side, a hinge plate pivotably coupled to the ramp body at a first end, a first cam arm coupled to a bottom surface of the ramp body, the first cam arm including a first cam wheel, and a second cam arm coupled to the bottom surface of the ramp body, the second cam arm including a second cam wheel; wherein, the first side rail and second side rail are pivotably moved between a folded position in which the side rails pivot inwardly and a raised position in which the side rails are oriented perpendicular to the ramp body; further wherein, the first cam arm operably pivots the first side rail between its folded and raised position, and the second cam arm operably pivots the second side rail between its folded and raised position.

In another embodiment of this disclosure, a ramp assembly is provided for use to accommodate a wheel-chaired passenger to enter or exit a motorized vehicle. The ramp assembly includes a ramp body having a length defined along a longitudinal direction, the ramp body including a first side, a second side, a first end and a second end; a first side rail pivotably coupled to the ramp body along the first side; a second side rail pivotably coupled to the ramp body along the second side; a hinge plate pivotably coupled to the ramp body at the first end; a first arm coupled to a bottom surface of the ramp body, the first arm including a first roller wheel; and a second arm coupled to the bottom surface of the ramp body, the second arm including a second roller wheel; wherein, the first side rail and second side rail are pivotably moved between a folded position in which the first and second side rails pivot inwardly and a raised position in which the side rails are oriented perpendicular to the ramp body; wherein, the first arm operably pivots the first side rail between its folded and raised position, and the second arm operably pivots the second side rail between its folded and raised position; further wherein, the ramp body moves between a stowed position and a deployed position, the first and second side rails being in their folded position when the ramp is in its stowed position and in their raised position when the ramp is in its deployed position.

In one example of this embodiment, the ramp assembly may include a carriage assembly coupled to the hinge plate; and a track assembly including a guide track defining a longitudinal channel along which the carriage assembly moves as the ramp is moved between its stowed and deployed positions. In a second example, the track assembly comprises a guide assembly at one end of the guide track and a stopper assembly at an opposite end thereof. In a third example, the stopper assembly includes an upper member; a lower member disposed within the channel of the guide track; and a stop member located between the upper member and the lower member; wherein, the upper member, lower member, and stop member are coupled to one another and the guide track. In a fourth example, the upper member comprises a type of material different from the lower member and stop member.

In a fifth example, the guide assembly may include a base plate configured to being coupled to a floor of the vehicle; a guide member having a tapered edge and being coupled to the base plate; a roller assembly coupled to the base plate and comprising a roller configured to rotate about a rotation axis, the rotation axis being substantially perpendicular to the longitudinal direction; and a centering block coupled to the base plate; wherein, as the ramp body moves between the stowed position and deployed positions, at least one of the first and second roller wheel engages the tapered edge of the guide member to induce pivotal movement of the corresponding first or second side rail between their folded and raised positions. In a sixth example, the ramp assembly may include a second guide member having a tapered edge and being coupled to the base plate at a side opposite the first guide member; wherein, the other of the first and second roller wheel engages the tapered edge of the second guide member to induce pivotal movement of the corresponding first or second side rail between their folded and raised positions.

In a seventh example, the centering block comprises a base portion and a raised portion, the base portion being coupled to the base plate. In an eighth example, the carriage assembly may include a carriage body; a wheel; a mounting arm for coupling the wheel to the carriage body; and one or more track wheels and a center wheel; wherein, as the carriage assembly moves along the guide track, the one or more track wheels and center wheel move within the longitudinal channel. In a ninth example, the ramp body comprises an opening formed therein for receiving a manual deployment device, the opening being formed near the second end and in close proximity to the first or second side rail. In a tenth example, at least one stiffener rib is coupled to the bottom surface of the ramp body, the at least one stiffener rib extending in the longitudinal direction from the first end to the second end of the ramp body.

In yet another embodiment of the present disclosure, a ramp assembly is provided for use to accommodate a wheel-chaired passenger to enter or exit a motorized vehicle. The ramp assembly includes a ramp body configured to be movable between a stowed position and a deployed position; a first side rail pivotably coupled to the ramp body along a first side; a second side rail pivotably coupled to the ramp body along a second side; and a manual deployment device coupled to the ramp body, the manual deployment device comprising a coupler end for coupling to the ramp body, a flexible cable, an outer tube surrounding the cable, and a handle for maneuvering the ramp body; wherein, as the ramp body is moved between its stowed position and deployed position, the first side rail and second side rail are pivotably moved between a folded position in which the side rails pivot inwardly and a raised position in which the side rails are oriented perpendicular to the ramp body.

In one example of this embodiment, a first arm coupled to a bottom surface of the ramp body, the first arm including a first wheel; and a second arm coupled to the bottom surface of the ramp body, the second arm including a second wheel; wherein, the first arm operably pivots the first side rail between its folded and raised position, and the second arm operably pivots the second side rail between its folded and raised position. In a second example, a carriage assembly is coupled to the ramp body; and a track assembly including a longitudinal channel along which the carriage assembly moves as the ramp is moved between its stowed and deployed positions. In a third example, the track assembly comprises a guide assembly at one end of the channel and a stopper assembly at an opposite end thereof. In a fourth example, the first arm is coupled to the first side rail to induce movement of the first side rail between its folded and raised positions as the first wheel engages the guide assembly; and the second arm is coupled to the second side rail to induce movement of the second side rail between its folded and raised positions as the second wheel engages the guide assembly.

In yet a further embodiment of the present disclosure, a motorized vehicle includes a chassis; a floor structure formed in the chassis, the floor structure defining an inner compartment; a ramp assembly movable between a stowed position in which the ramp assembly is located in the compartment and a deployed position, the ramp assembly comprising a ramp body, a first side rail pivotably coupled to the ramp body along a first side, a second side rail pivotably coupled to the ramp body along a second side, a hinge plate pivotably coupled to the ramp body, a first arm coupled to a bottom surface of the ramp body, the first arm including a first roller wheel, and a second arm coupled to the bottom surface of the ramp body, the second arm including a second roller wheel; wherein, the first side rail and second side rail are pivotably moved between a folded position in which the side rails pivot inwardly, and a raised position in which the side rails are oriented perpendicular to the ramp body; further wherein, the first arm operably pivots the first side rail between its folded and raised position, and the second arm operably pivots the second side rail between its folded and raised position.

In one example of this embodiment, the ramp assembly includes a carriage assembly coupled to the hinge plate; and a track assembly including a guide track defining a longitudinal channel along which the carriage assembly moves as the ramp is moved between its stowed and deployed positions. In another example, a guide assembly is coupled to the track assembly, the guide assembly including a base plate configured to being coupled to the floor structure; a guide member having a tapered edge and being coupled to the base plate; a roller assembly coupled to the base plate and comprising a roller configured to rotate about a rotation axis, the rotation axis being substantially perpendicular to the longitudinal direction; and a centering block coupled to the base plate; wherein, as the ramp body moves between the stowed position and deployed positions, at least one of the first and second roller wheel engages the tapered edge of the guide member to induce pivotal movement of the corresponding first or second side rail between their folded and raised positions.

In a further example, the carriage assembly may include a carriage body; a wheel; a mounting arm for coupling the wheel to the carriage body; and one or more track wheels and a center wheel; wherein, as the carriage assembly moves along the guide track, the one or more track wheels and center wheel move within the longitudinal channel.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
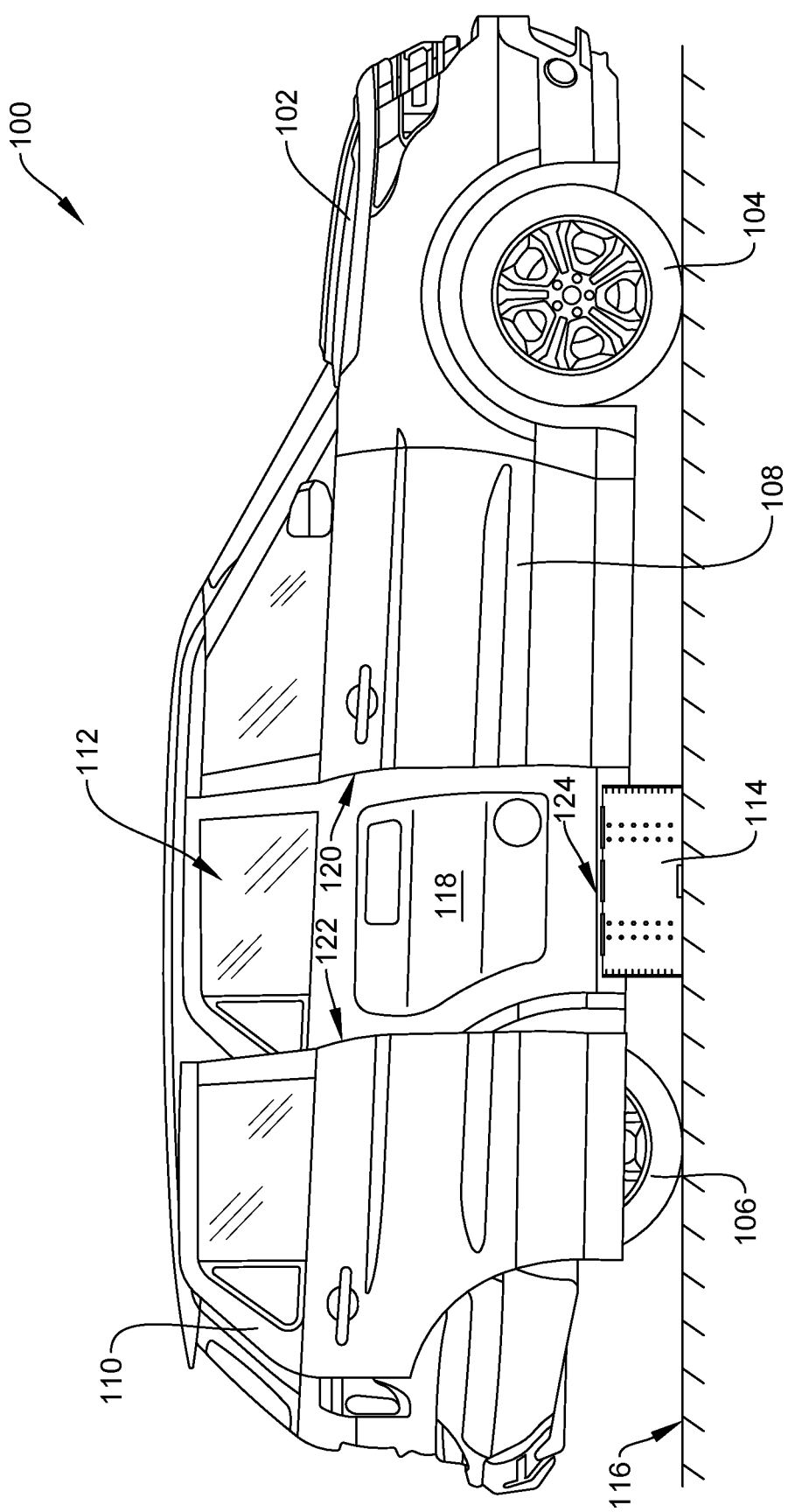
FIG. 1 is an elevational side view of a passenger vehicle including an access ramp.

FIG. 1 illustrates a vehicle 100, commonly identified as a passenger van or bus, available from any number of United States and foreign manufacturers. The vehicle may be a tour bus, a double-decker bus, or any other type of vehicle. The principles and teachings of the present disclosure may be used for any type of vehicle.

In the illustrated embodiment of FIG. 1, the vehicle 100 includes a unibody construction, but other vehicles having a frame on body construction, are also included in the present disclosure. Consequently, the use of vehicle herein includes all types and kinds of vehicles with a body on frame construction, a unibody construction, or other constructions. In addition, while the passenger van 100 is illustrated in FIG. 1, the present disclosure is directed to all passenger vehicles carrying one or more passengers including, but not limited to, a bus, motor coach, sport-utility vehicle, truck, taxi, ambulance, or passenger car.

The vehicle 100 includes a frame or chassis 102 operatively coupled to front wheels 104 and rear wheels 106 that propel the vehicle 100 along a ground surface 116. A first passenger side door 108 is located between the front wheels 104 and the rear wheels 106, and provides access to a passenger for sitting in a front seat of the vehicle 100 adjacent to a driver.

The vehicle 100 includes a second passenger side door 110 coupled to the frame 102. The side door 110 may be modified to slide along one or more tracks to increase the size of an opening 112 to an interior 118 of the vehicle 100. The widened opening 112 may provide access, for example, to a passenger seated in a wheelchair to enter and exit the vehicle 100. The opening 112 is defined on the sides thereof by an edge 120 of the door 108 or door frame of the vehicle 100 and the edge 122 of the rear passenger side door 110. The vehicle 100 may be further modified to include a ramp assembly 114 which provides rolling access of a wheelchair from the ground surface 116 into the interior 118 of the vehicle 100. The ramp assembly 114 is installed at the opening 112 near a floor 124 (or sub-floor) of the vehicle 100, and is movable between the interior 118 of the vehicle 100, where it is stored in some embodiments, and to the exterior for wheelchair access. As shown, an edge or end of the ramp assembly 114 may contact the ground surface 116 at one end of the ramp 114, and the floor 124 at an opposite end thereof.

In some embodiments, the floor 124 of the vehicle 100 may be modified such that it is lowered to allow better ingress and egress of a wheel-chaired passenger along the ramp 114. In some instances, the floor 124 may actually be lowered so that when deployed, the angle of the ramp 114 is less steep as it extends from the floor 124 to the ground 116.

In some embodiments, the ramp assembly may be removably coupled to the vehicle 100 such that in its deployed position, it is coupled to the floor 124 or a portion of the chassis 102 to allow for ingress and egress of the interior 118. When the ramp 114 is no longer needed, the ramp 114 may be decoupled or removed from the vehicle 100 and stored therein, or stored at another location.

Figure 2:
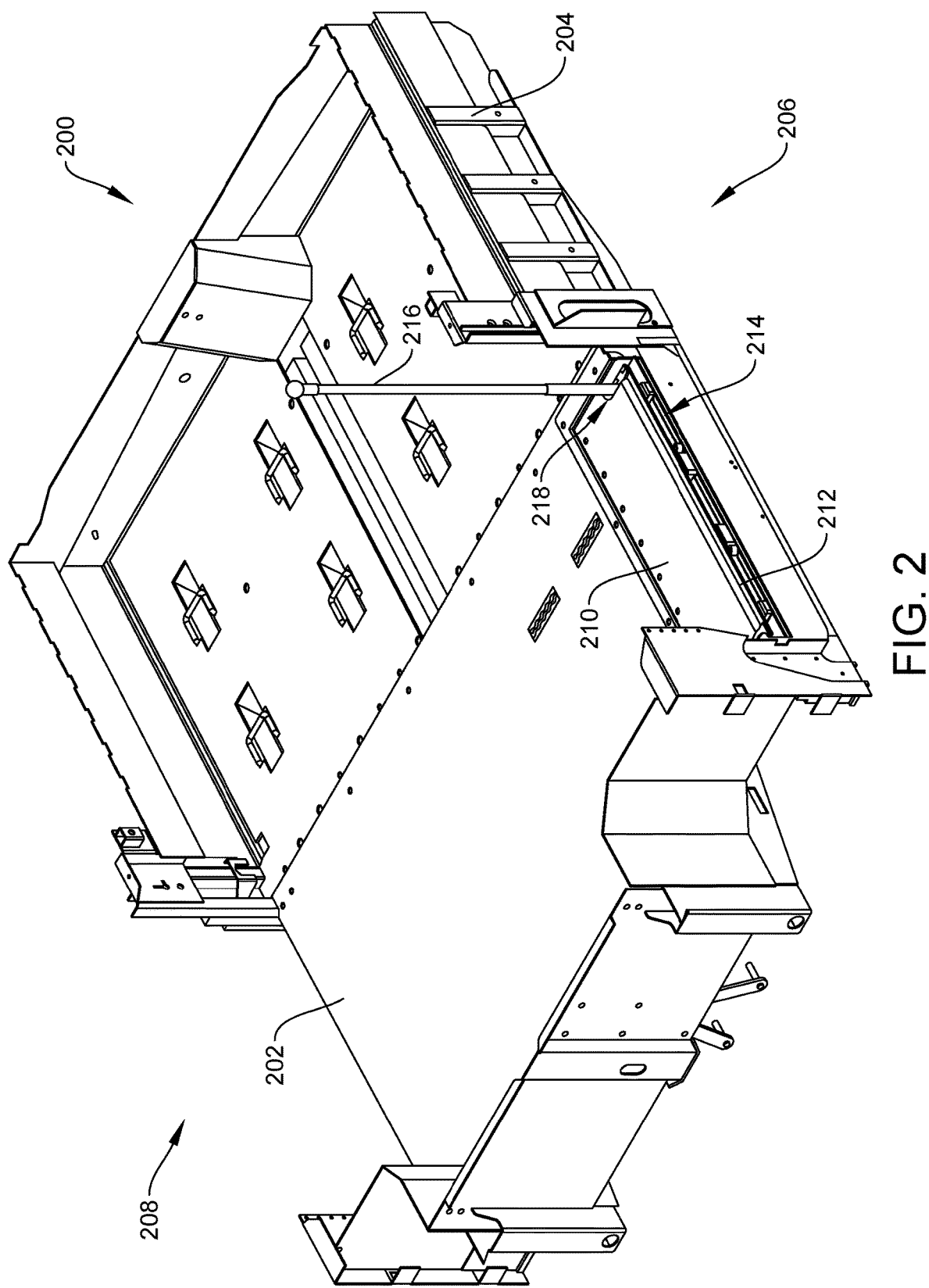
FIG. 2 is a perspective view of a first embodiment of a ramp assembly in a stowed position.

In FIG. 2, a first embodiment of a ramp assembly for use with a vehicle is shown which may be incorporated into a passenger vehicle such as a bus, motor coach, sport-utility vehicle, van or any other passenger vehicle. As shown, a portion of a vehicle chassis 204 and floor structure 200 of a vehicle similar to the one in FIG. 1 is provided. This floor structure 200 may be located at a side entry location of the vehicle such as the one shown in FIG. 1, or it may be at a different location (e.g., a rear location of the vehicle).

The floor structure 200 may include a cover 202 as shown. The cover 202 may be part of a sub-floor of the actual vehicle floor. In any event, the cover 202 may span an entire width of the vehicle floor 124, or it may only span a portion of the width. In other words, the cover 202 may extend from a first side 206 of the vehicle to a second side 208 thereof. The first side 206 may represent an exterior or entry/exit side of the vehicle that corresponds with the opening 112 of FIG. 1. The second side 208 may represent an interior location of the vehicle, or it may represent a rear passenger door on the opposite side of the vehicle.

A transition plate 210 may be provided in the embodiment of FIG. 2. The transition plate 210 provides a surface upon which a wheel-chaired passenger may roll over as it transitions from either a ramp assembly 212 or the vehicle floor (depending upon egress or ingress of the passenger). The transition plate 210 extends from an end of the cover 202 to an opening formed by the door frame of the vehicle. The transition plate 210 may be fastened or coupled to the floor structure 200 or vehicle chassis 204 in any known manner.

The cover 202 and transition plate 210 may form an upper portion of a compartment 214 defined in the vehicle floor structure 200 or chassis, such that the ramp assembly 212 may be disposed within the compartment 214 in its stowed or retracted position. To maneuver the ramp assembly 212 from its stowed position, a manual deployment device, stick, or handle rod 216 may be provided. The deployment device 216 may include an elongated rod that is coupled to the ramp assembly 212. The transition plate 210 may define a slot or trimmed portion 218 which allows the manual deployment device 216 to remain coupled to the ramp assembly 212 and oriented in a substantially perpendicular direction relative to the ramp assembly 212 and cover 202 in the stowed position of FIG. 2.

Figure 12:
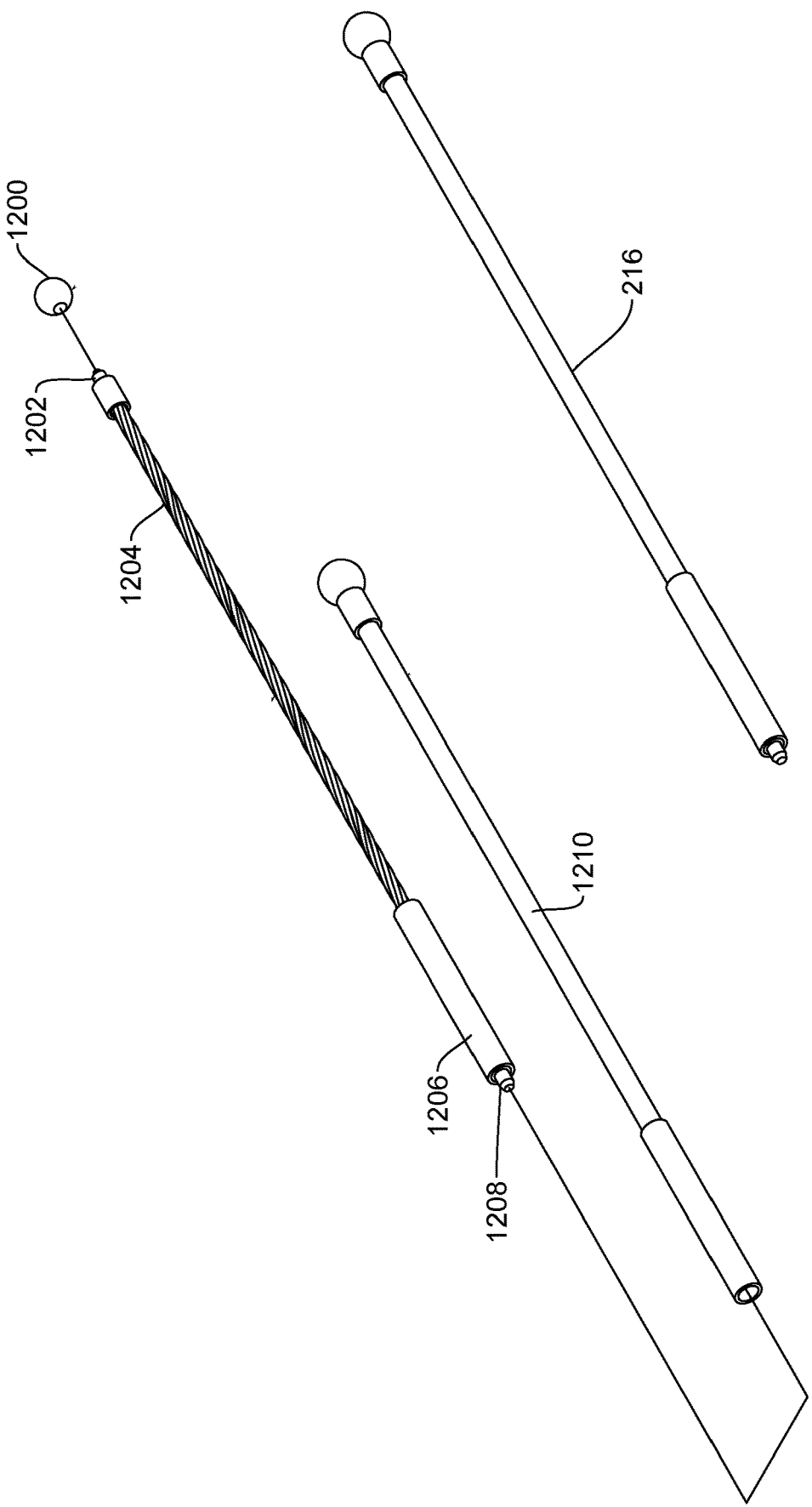
FIG. 12 is an exploded and assembled views of a manual deployment device.
Figure 13:
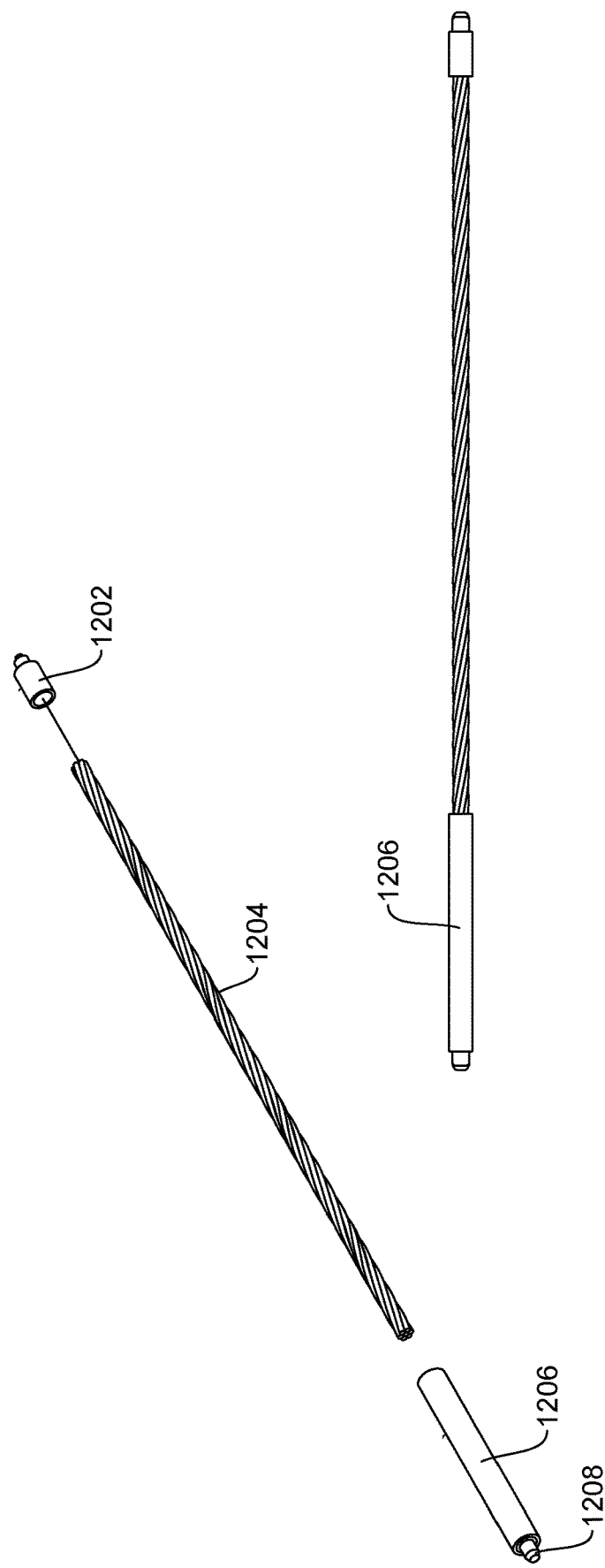
FIG. 13 is another exploded perspective view of the manual deployment device of FIG. 12.

The manual deployment device 216 is further shown in FIGS. 12 and 13. In FIG. 12, for example, the manual deployment device 216 may include a first end at which a ball handle 1200 is disposed and a second end at which a threaded end 1208 is disposed. The threaded end 1208 may include an elongated portion or stem with external threads for coupling to the ramp assembly 212 of FIG. 2. In another embodiment, the coupling end 1208 of the manual deployment device 216 may include a clip, latch, or other means for snapping, clicking, latching or otherwise coupling to the ramp assembly 212. For instance, the connection between the ramp assembly 212 and manual deployment device 216 may be formed by a quick connect-disconnect mechanism known in the art. Alternatively, the connection may be formed by inserting the coupling end 1208 of the device 216 into an opening 1010 (see FIG. 10) of the ramp assembly 212 and then turning or rotating the device 216 to releasably lock the manual deployment device 216 into place with respect to the ramp assembly 212. Although not shown, the ramp assembly 212 may include a spring disposed in the opening 1010 such that the coupling end 1208 is pushed into the opening to compress the spring and then either snaps into place (i.e., an outer groove on the coupling end being disposed within an internal groove of the ramp) or rotated to lock into place. While these aforementioned embodiments are presented to suggest various ways of releasably coupling the manual deployment device to the ramp, this is not intended to be a comprehensive list of examples. Other conventional ways of coupling the device 216 to the ramp assembly 212 may be incorporated.

Moreover, in at least one embodiment, the manual deployment device 216 may be fixedly attached to the ramp assembly 212 such that it is not removable. In this embodiment, the manual deployment device 216 may be able to fold downwardly to collapse into a stowed position. Alternatively, the device 216 may be telescopically collapsed in a stored position.

In FIGS. 12 and 13, the manual deployment device 216 may further include a second coupling end 1202 which may be coupled to the ball handle 1200 via any known means including crimping and/or adhesive. For example, the ball handle 1200 may include a threaded opening for screwing onto external threads on the second coupling end 1202. Other coupling means may be provided for coupling the ball handle 1200 to the second coupling end 1202.

Figure 6:
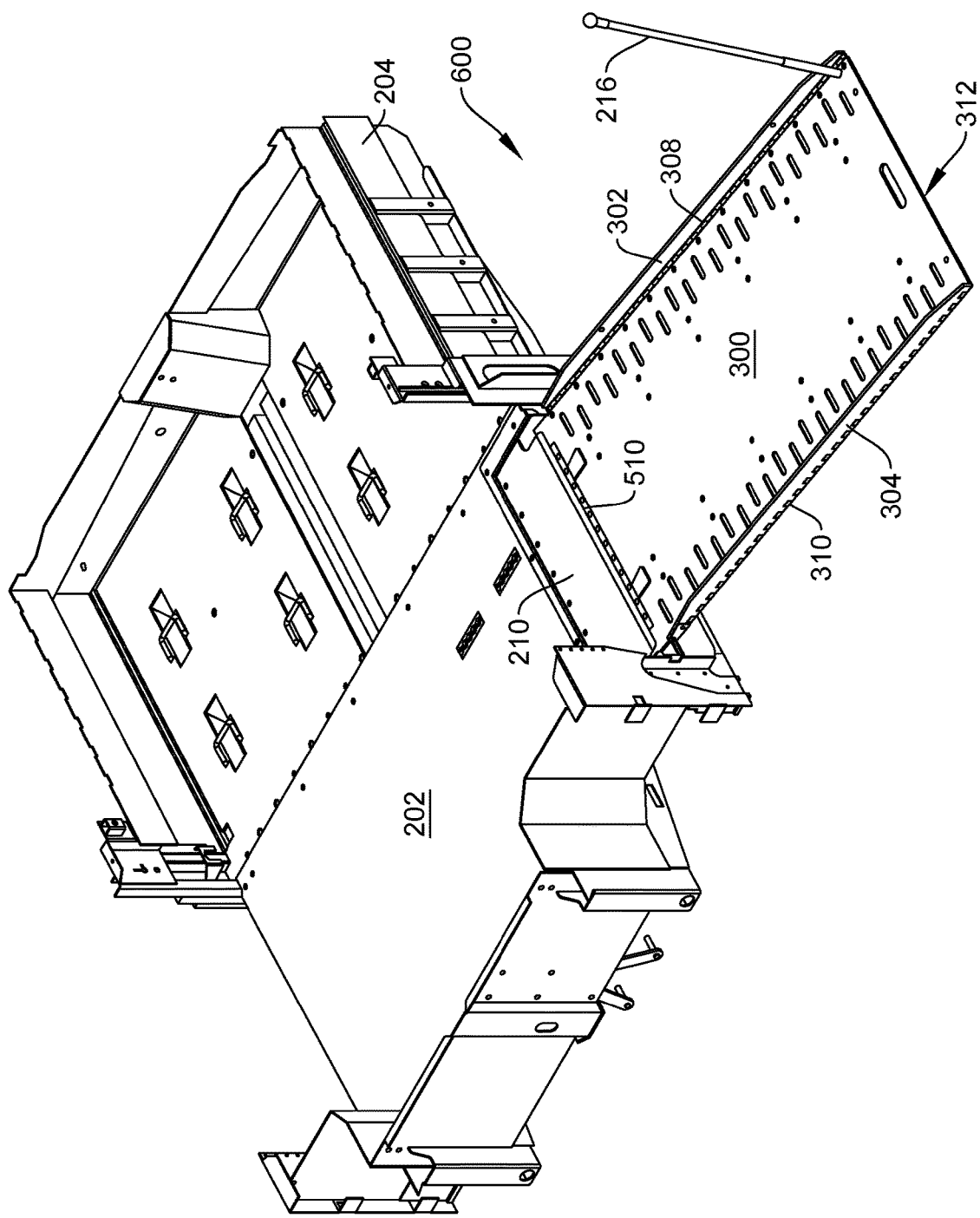
FIG. 6 is a perspective view of the ramp assembly of FIG. 2 in a fully deployed position.

The manual deployment device 216 may further include an elongated cable 1204 over which a hollow tube 1210 is disposed. The device 216 may also include a stem portion 1206 that partially covers and is crimped, adhered, welded or otherwise coupled to the cable 1204. The cable 1204 may have a degree of flexibility that allows the manual deployment device 216 to bend or flex as it is used by an operator to move the ramp assembly 212 between its stowed position (FIG. 2) and its fully deployed position (FIG. 6). The cable 1204 also allows for the device 216 to be designed without a spring or biasing member, as is conventional in the art, and thus the manual deployment device 216 can be manufactured at a lower cost.

While the cable 1204 allows for the manual deployment device 216 to have some amount of flexibility, it also has a degree of rigidity that returns or biases the device 216 to its rest position. In its rest position, the manual deployment device 216 may be disposed in a substantially perpendicular orientation relative to the ramp assembly 212. This is shown, for example, in FIGS. 2 and 3.

Figure 3:
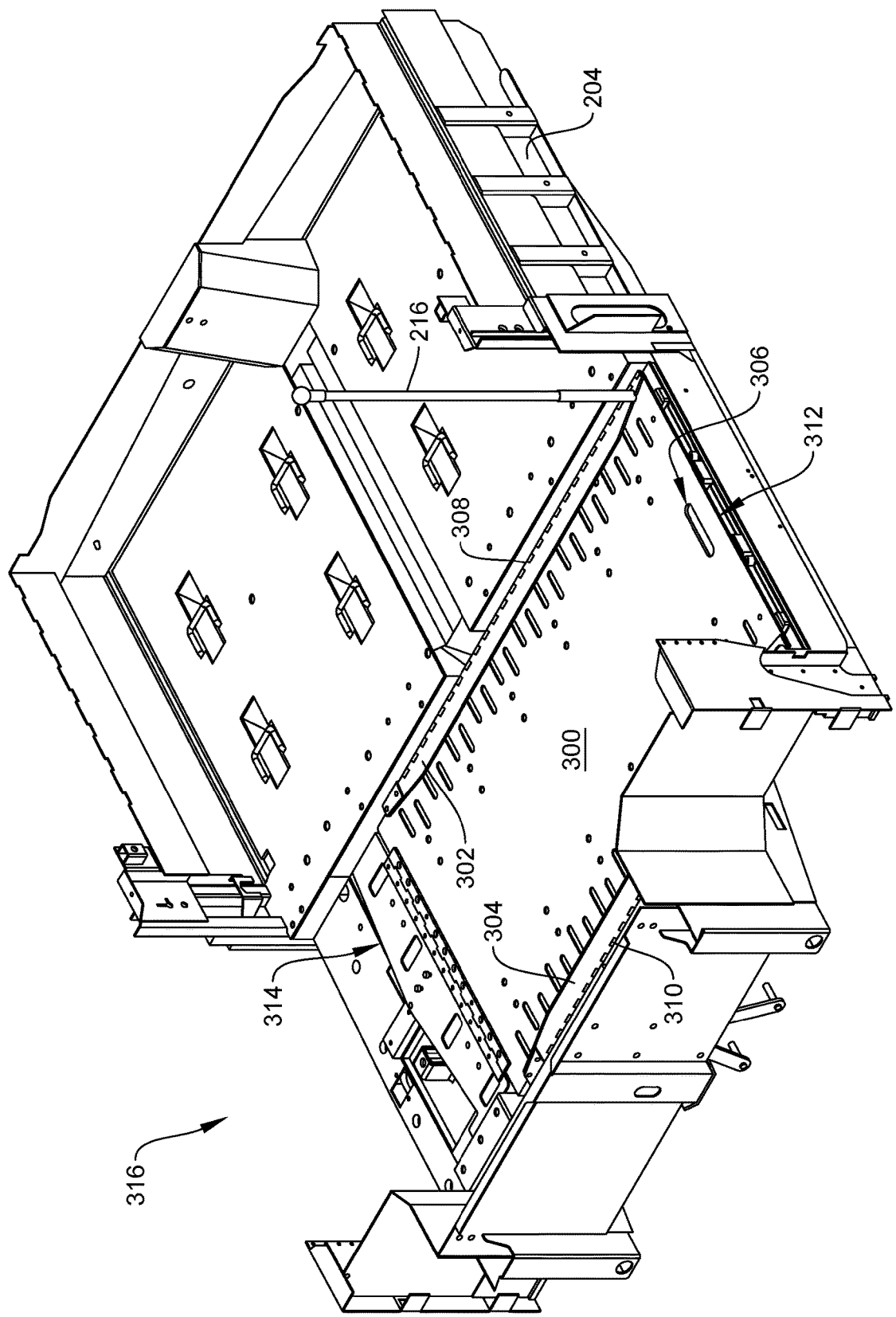
FIG. 3 is a second perspective view of the ramp assembly of FIG. 2 in a stowed position with a cover of the vehicle floor removed.

Referring now to FIG. 3, the floor structure 200 of FIG. 2 is again illustrated but with the cover 202 and transition plate 210 removed. As shown, the ramp assembly 212 comprises a substantially rectangularly-shaped ramp body 300 having a top surface upon which a wheel-chaired passenger may travel during ingress and egress the vehicle. The body 300 may be defined longitudinally between a first end 312 and a second end 314. In FIG. 3, the ramp is shown in its fully stowed position 316. In this position, the first end 312 is disposed underneath the transition plate 210 and within the compartment 214 defined in the chassis 204 and floor structure 200. In other words, the first end 312 does not extend past a vertical plane defined by an outermost edge of the transition plate 210. This allows the ramp assembly 212 to be fully stowed in a position that does not interfere with or contact a door from moving between an open and closed position.

The ramp 300 of FIG. 3 is shown including a handle opening 306 to allow an operator to manipulate the ramp as necessary. For instance, the ramp 300 may be designed with or without the manual deployment device 216, and thus maneuvering the ramp 300 may be done in via the handle opening 306.

The ramp 300 is also shown having a pair of side rails. A first side rail 302 is configured to extend a majority of the length of the ramp 300, and is pivotably coupled thereto. In FIG. 3, the first side rail 302 is shown being hingedly coupled to the ramp body 300 via a first set of hinges 308. Similarly, a second side rail 304 is disposed along the opposite side of the ramp body 300 and it too is pivotably coupled thereto. The second side rail 304 may be coupled via a second set of hinges 310. Other means may be provided to permit the pivotal movement of the side rails relative to the ramp body 300.

Figure 4:
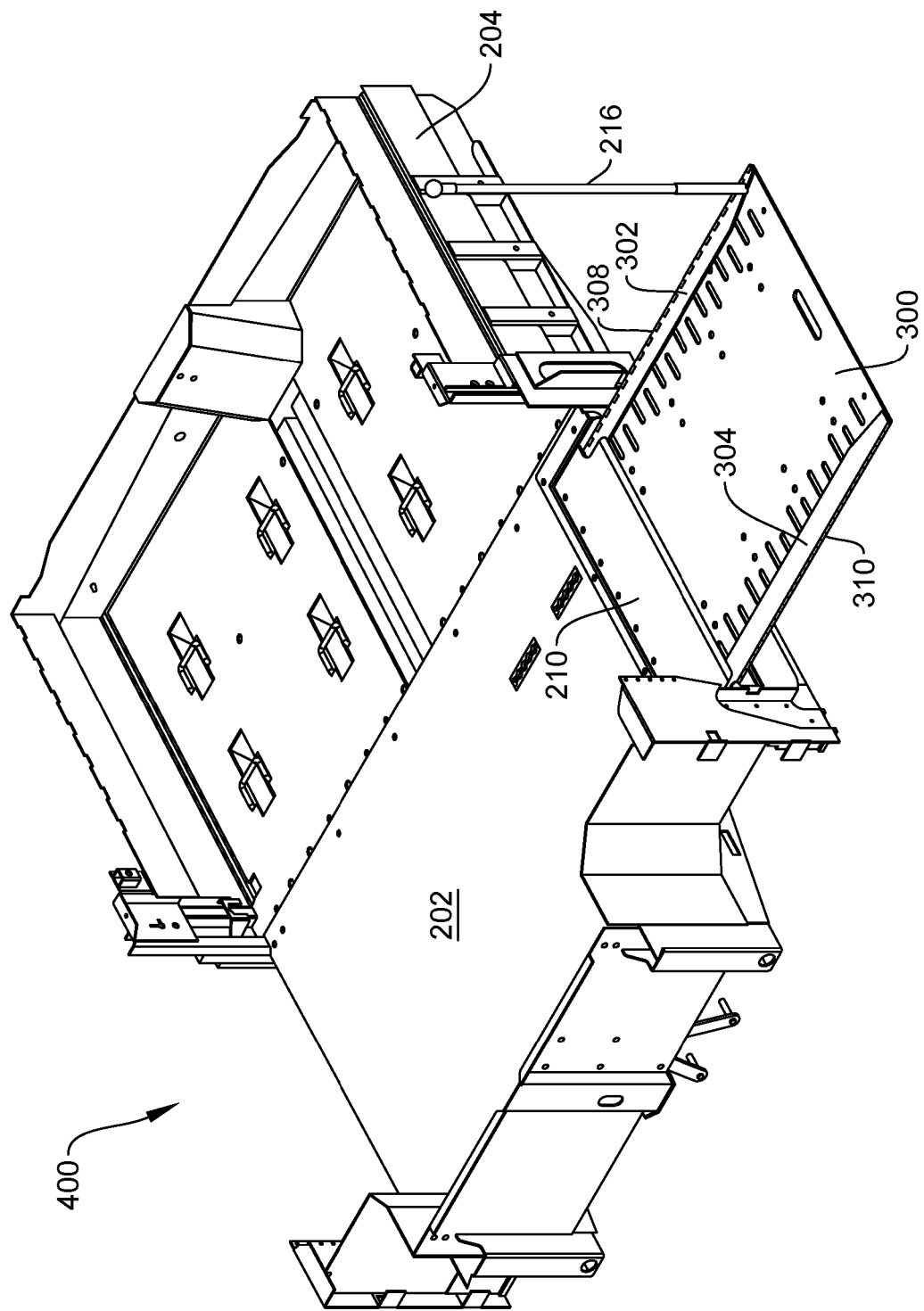
FIG. 4 is a perspective view of the ramp assembly of FIG. 2 in a partially stowed position.

The side rails 302, 304 are disposed in a downward or folded position in the fully stowed position of FIG. 3. Moreover, as the ramp 300 is moved longitudinally from the fully stowed position to a partially stowed position 400 of FIG. 4, the pair of side rails remain in their folded position.

Figure 5:
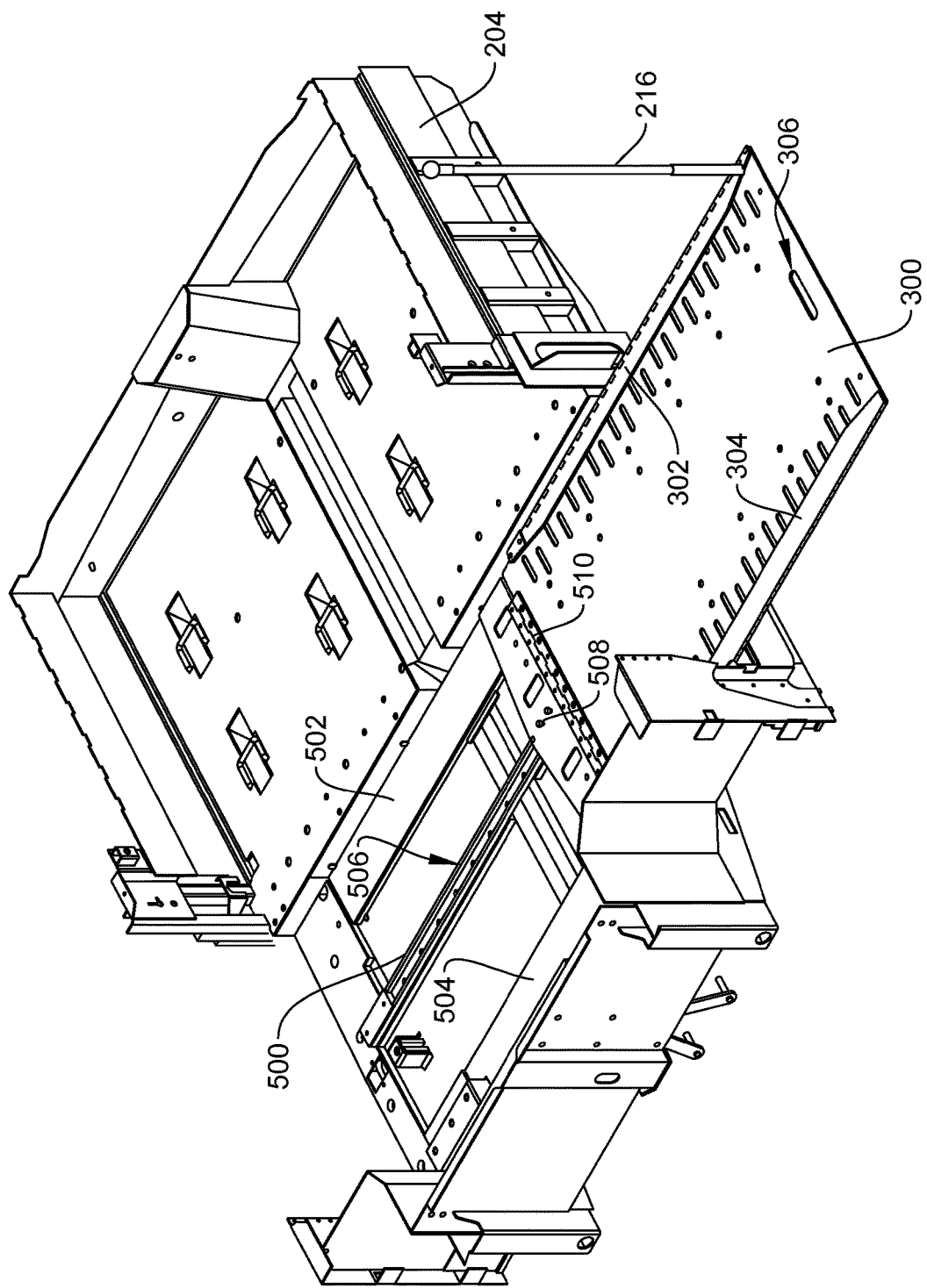
FIG. 5 is a second perspective view of the ramp assembly of FIG. 2 in a partially stowed position with a cover of the vehicle floor removed.
Figure 7:
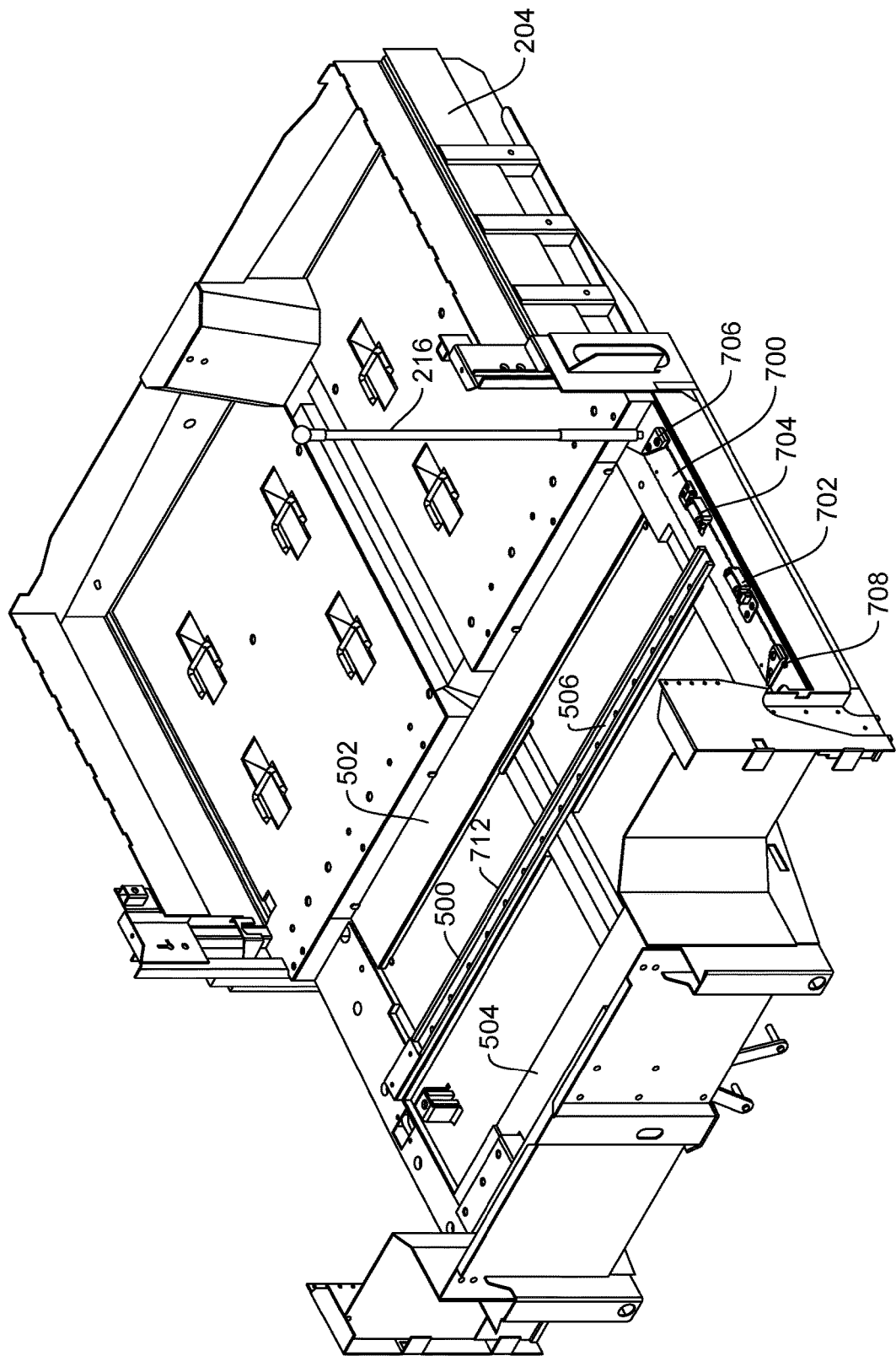
FIG. 7 is a perspective view of a guide assembly of a vehicle floor.
Figure 8:
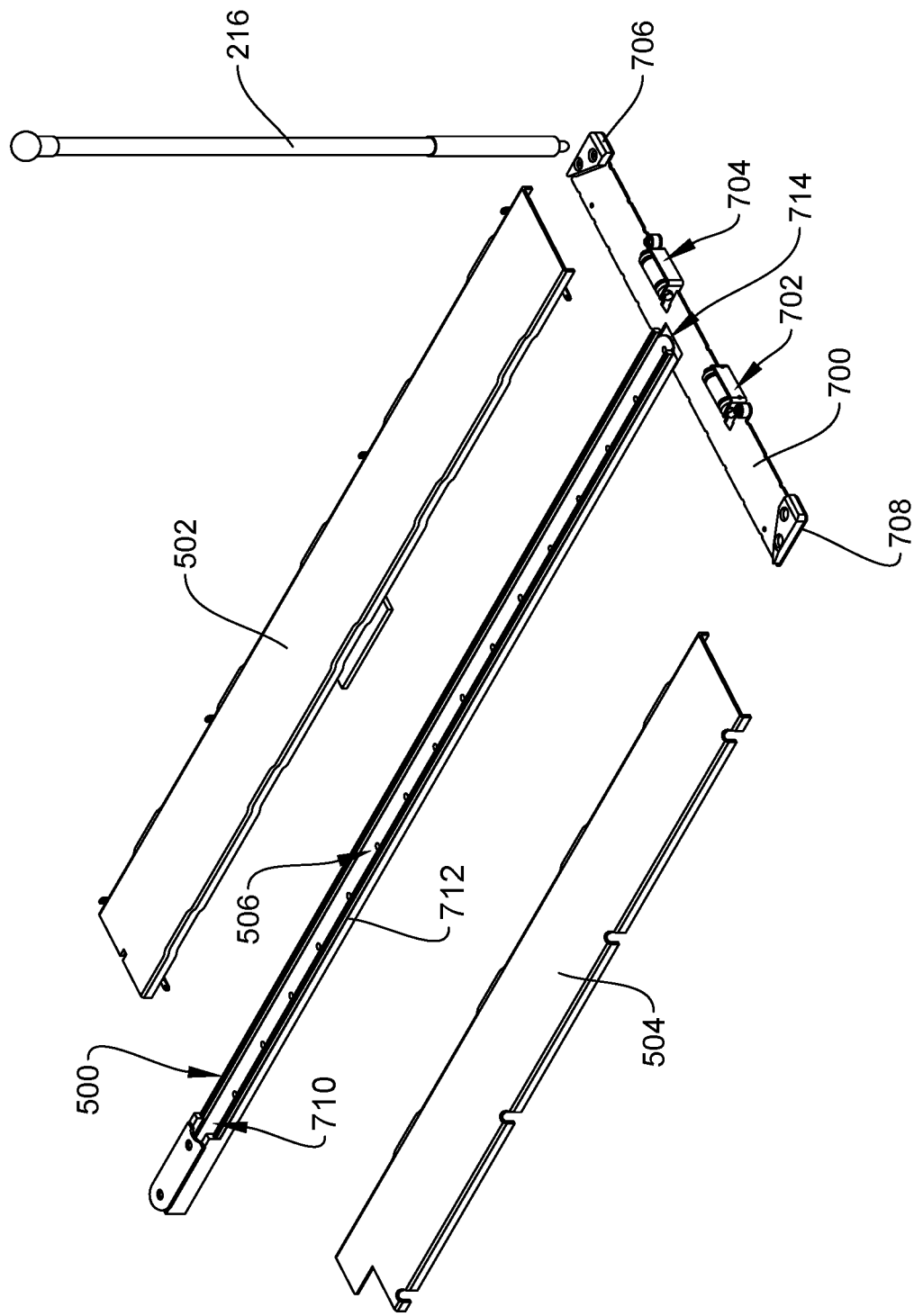
FIG. 8 is an exploded view of the guide assembly of FIG. 7.

In FIG. 5, the ramp 300 is shown in its partially stowed position. Here, the cover 202 and transition plate 210, however, are removed so that a ramp guide assembly 500 is shown. The ramp guide assembly 500 may include a longitudinal track that extends a distance to permit the ramp 300 to move from its fully stowed position to its fully deployed position. In FIGS. 7-8, the ramp guide assembly 500 is shown with the ramp 300 removed. As shown, the ramp guide assembly 500 includes a track or guide that defines a longitudinal groove or slot 506. A first spacer plate 502 and a second spacer plate 504 may flank either side of the ramp guide assembly 500. Each spacer plate is spaced from the track and includes a top surface upon which a portion of the ramp 300 may contact. The spacer plates 502, 504 are best shown in FIG. 8.

Returning to FIG. 5, the ramp 300 is shown including a hinge 510 extending transversely across a width of the ramp. The hinge 510 allows the ramp 300 to pivot with respect to a ramp support plate 508 such that the ramp 300 may be disposed at an angle in its fully deployed position. This is best shown, for example, in FIG. 6 in which the ramp 300 pivots with respect to the hinge 510 so that the first end or edge 312 of the ramp 300 may contact the ground in the fully deployed position 600. As also shown, the transition plate 210 may interface with the ramp 300 near the hinge 510 to provide a smooth transition of a wheel-chaired passenger between the vehicle floor and the ramp 300.

Figure 9:
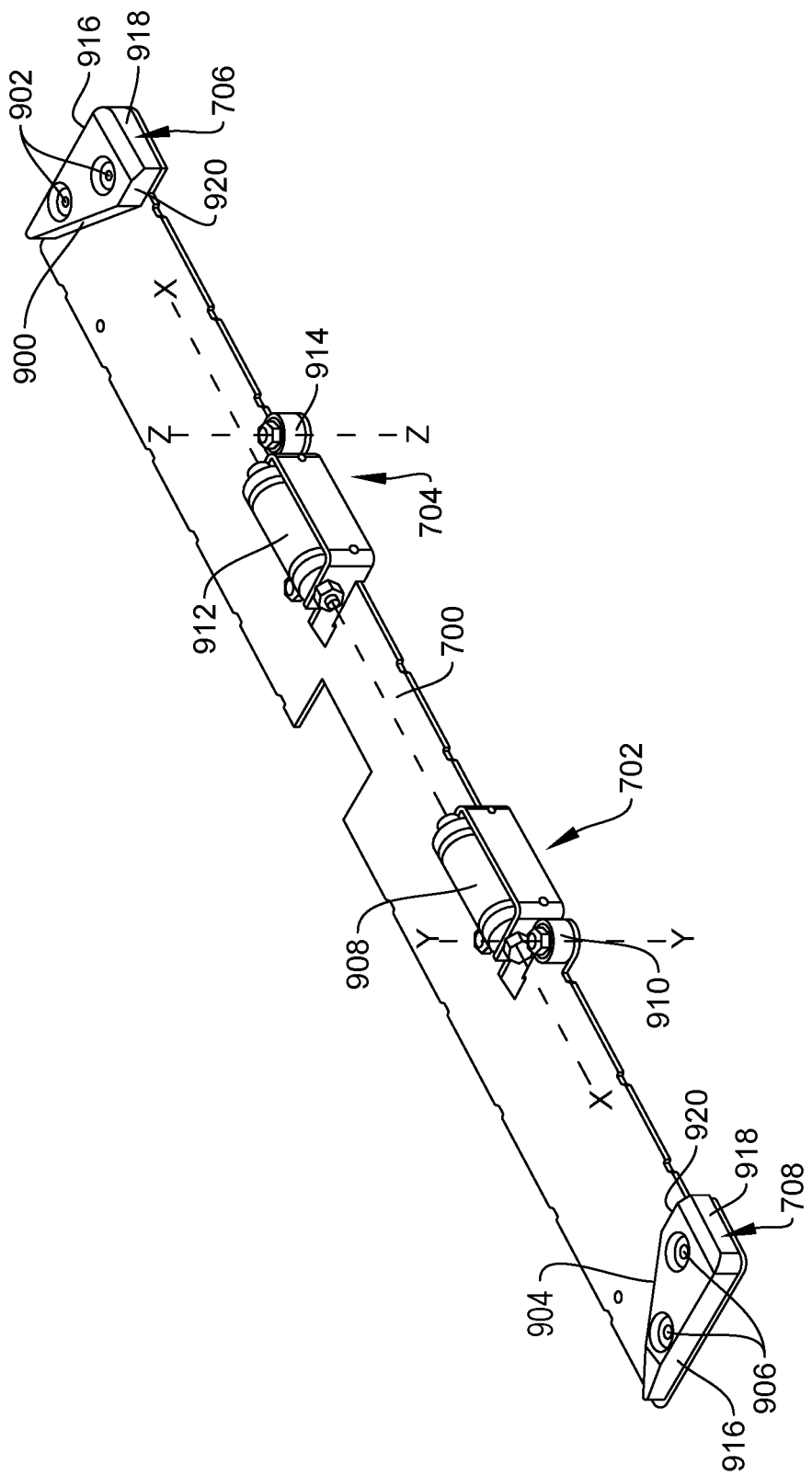
FIG. 9 is an enhanced perspective view of a portion of the guide assembly of FIG. 7.

As shown in FIGS. 7-9, the ramp guide assembly 500 includes the aforementioned track 712 (FIGS. 7 and 8) that extends longitudinally between a first end 710 and a second end 714. The ramp 300 may be in contact with the track 712 during its transition between the fully stowed position and fully deployed position 600. This will be described below with reference to FIGS. 10 and 11.

In FIGS. 7-9, the ramp guide assembly 500 may also include a transverse plate 700 coupled to the vehicle floor structure 200 or chassis 204 at a location near or below the door of the vehicle. The plate 700 extends in a direction transverse to the length of the track 712. The second end 714 of the track 712 may be coupled or simply contact an upper surface of the plate 700, as shown in FIGS. 7 and 8. The plate 700 may include a first roller assembly 702 and a second roller assembly 704. Each roller assembly may be positioned adjacent or to the side of the track 712. As shown in FIG. 9, the first roller assembly 702 may include a first support roller 908 and a first centering roller 910. Likewise, the second roller assembly 704 may include a second support roller 912 and a second centering roller 914. The first and second support rollers may be formed by a wheel or caster that rotates about a horizontal axis, X-X. As such, the support rollers are axially aligned to rotate about the same axis. In other embodiments, however, the pair of support rollers may be aligned in parallel but not axially aligned. In another embodiment, the pair of support rollers may rotate about different axes that are neither axially aligned or aligned in parallel. Nevertheless, the pair of support rollers may engage an underside or bottom surface 1100 of the ramp 300 to support the ramp as it moves between its stowed and deployed positions.

The first centering roller 910 may be coupled to the plate 700 such that it rotates about a substantially vertical axis, Y-Y. In this manner, the first centering roller 910 rotates about an axis that is substantially perpendicular to the axis upon which the first support roller 908 rotates. Similarly, the second center roller 914 may be coupled to the plate 700 such that it rotates about another substantially vertical axis, Z-Z. As such, the second centering roller 914 rotates about an axis that is substantially perpendicular to the axis upon which the second support roller 912 rotates. Further, the first and second centering rollers may rotate about a pair of vertical axes that are not axially aligned, but may be aligned in parallel to one another. In any event, the pair of centering rollers assist with keeping the ramp 300 centered and aligned as it travels along the track 712 between its stowed and deployed positions.

At each end of the plate 700, a first guide block 706 and a second guide block 708 may be provided. Each guide block may be coupled to the plate 700. In FIG. 9, the first guide block 706 may be coupled via one or more fasteners 902. Similarly, the second guide block 708 may be coupled via one or more fasteners 906. The perimeter or outer edges of each guide block may be formed by a first straight edge 916, a second straight edge 918, a third straight edge 920, and a tapered edge. For instance, the first guide block 706 may include a first tapered edge 900 and the second guide block 708 may include a second tapered edge 904. The tapered edges may be formed between the first straight edge 916 and the third tapered edge 920. The tapered edge may also be formed on the opposite side of the block from the first straight edge 916. As shown, the first straight edge 916 is longer than the second straight edge 918, which is longer than the third straight edge 920. Due to the tapered edge, each guide block forms a substantially triangular shape. In each case, the first straight edge 916 faces away from the ramp 300, and the third straight edge 920 and tapered edge faces toward the ramp 300. The ramp 300 may therefore come into contact with the tapered edge and third straight edge 920, as described below.

The tapered edge in each guide block may be tapered or angled at an acute angle, i.e., less than 90° with respect to the first straight edge 916. In one non-limiting example, the tapered edge may be angled at 75° or less. In another example, the tapered edge may be angled at 60° or less. In a third example, the tapered edge may be angled at 45° or less. In a further example, the tapered edge may be angled at 30° or less. The angle may depend upon the width of the ramp, the width of the plate 700, and the components of the ramp that contact the tapered edge as will be describe below.

Figure 10:
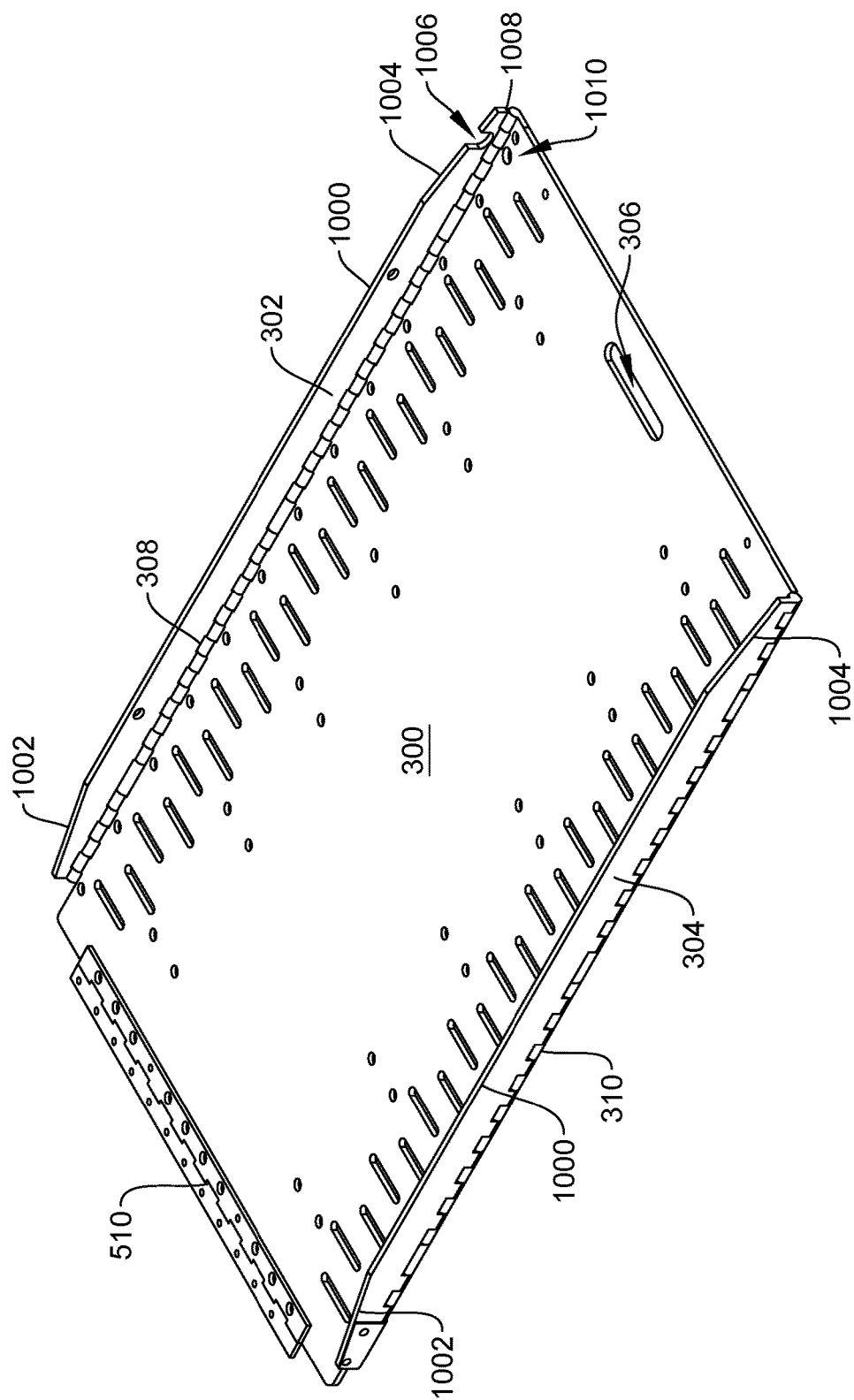
FIG. 10 is a perspective view of the ramp assembly of FIG. 2.
Figure 11:
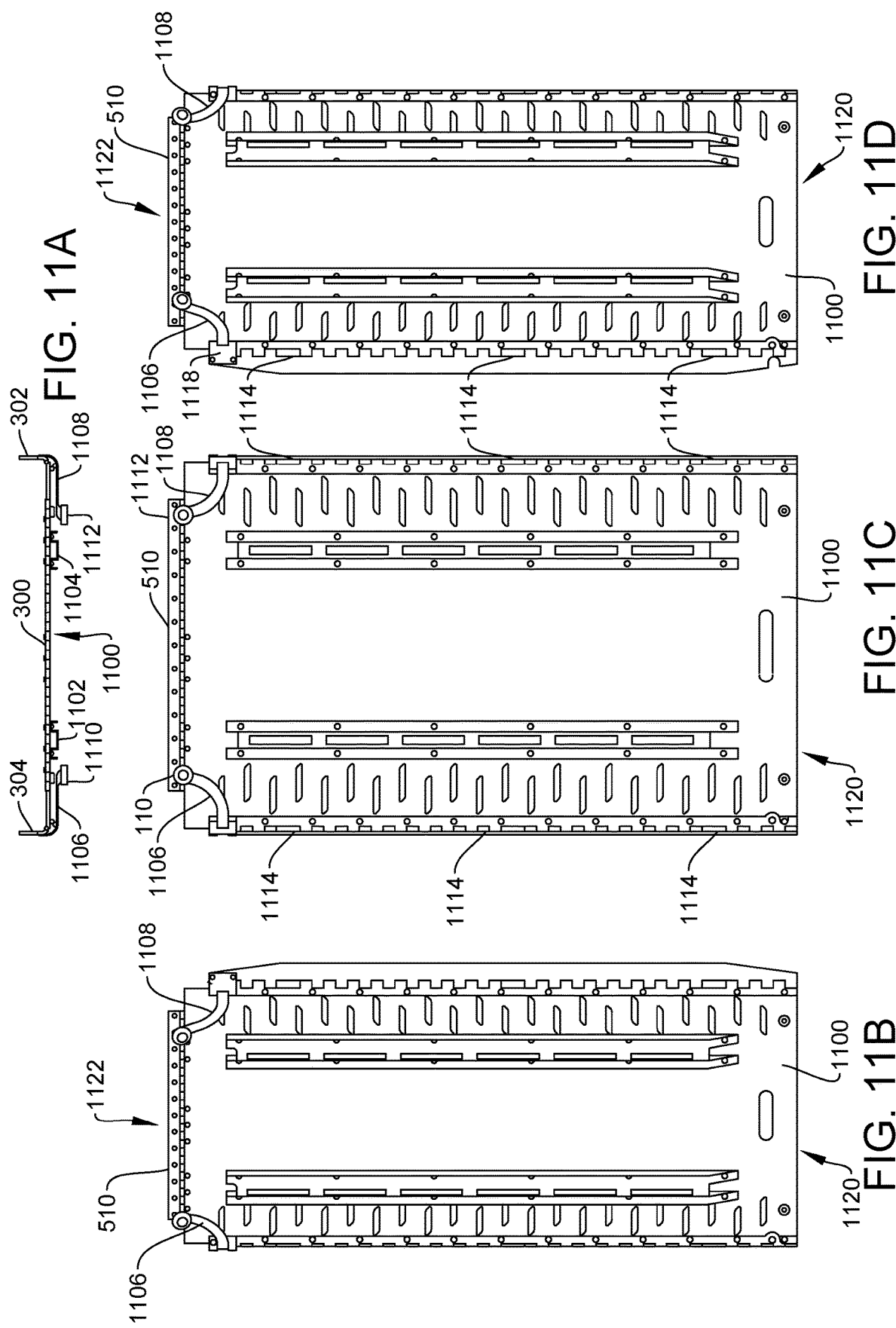
FIG. 11A is a front view of the ramp assembly of FIG. 2.
FIG. 11B is a bottom view of the ramp assembly of FIG. 2.
FIG. 11C is a bottom view of the ramp assembly of FIG. 2 oriented at an angle.
FIG. 11D is a bottom view of the ramp assembly of FIG. 2 oriented at another angle.

In FIG. 10, the ramp 300 is shown by itself. Here, the ramp 300 is shown having its hinge plate 510 at one end and the pair of side rails extending along the sides thereof. The second side rail 304 may be a single piece of material, e.g., steel, plastic, aluminum, or other material used for constructing a ramp. The same may be true of the first side rail 302. Each side rail may be formed by a substantially straight elongate portion 1000, a first angled portion 1002, and a second angled portion 1004. The first angled portion 1002 is disposed nearest the hinge plate 510, whereas the second angled portion 1004 may be disposed nearest the handle opening 306.

The elongate portion 1000 may be designed to have a substantially uniform thickness and height, whereas each angled portion has a decreasing height moving away from the elongate portion 1000.

The second angled portion 1004 of the first side rail 302 may include a defined gap or slot 1006. The defined gap or slot 1006 is sized such that the side rail 302 does not contact or interfere with the manual deployment device 216 as it moves between its raised and folded positions. The ramp 300 may also include an opening 1010 for receiving the coupling end 1208 of the manual deployment device 216. The opening 1010 may be formed in the top surface of the ramp 300, and the opening may be threaded to receive corresponding threads of the coupling end 1208. As noted above, the opening may include a groove, latch, clip, or other mechanism besides or in addition to threads for engaging with the coupling end 1208.

As shown in FIG. 10, the opening 1010 may be formed in the ramp 300 in alignment with the gap or slot 1006 defined in the first side rail 302. Again, this alignment allows for the movement of the side rail between its folded position and raised position.

The first side rail 302 may also include an end portion 1008 as shown in FIG. 10 that may be optionally removed. With the end portion 1008, the slot or gap 1006 is provided. In the event of the first side rail 302 not having the end portion 1008, then the first side rail 302 may simply have a shorter length compared to the second side rail 304, where the shorter length allows for the first side rail 302 to move freely between its folded and raised positions without contacting the manual deployment device 216.

Turning now to FIGS. 11A-D, the ramp 300 is shown from the front (FIG. 11A) and its bottom (FIGS. 11B-D). As shown, the ramp 300 includes a bottom surface 1100 that is opposite the top surface. Along the bottom surface 1100, the ramp 300 may include a first track member 1102 and a second track member 1104. The first and second track members may extend longitudinally along the length of the ramp 300, but each is spaced transversely from one another.

The ramp 300 may also include a first cam arm 1106 and a second cam arm 1108. The first cam arm 1106 is coupled to the bottom surface 1100 of the ramp 300 via a bracket 1118. The second cam arm 1108 is coupled to the bottom surface 1100 of the ramp 300 via a bracket 1118. Both cam arms are coupled to the bottom surface 1100 towards a rear end 1122 of the ramp 300. The rear end 1122 of the ramp 300 corresponds to the end at which the hinge plate 510 is coupled, and is opposite a front end 1120 of the ramp 300 which may contact the ground in the fully deployed position 600.

At an end opposite the bracket 1118, the first cam arm 1106 may include a first cam wheel 1110. Likewise, at an end opposite the bracket 1118, the second cam arm 1108 may include a second cam wheel 1112. Each cam wheel may freely rotate about the cam arm. In other embodiments, the cam wheel may simply be a cam that does not rotate.

In FIGS. 11C and 11D, the ramp 300 is further illustrated as including one or more springs 1114. The springs 1114 work in conjunction with the pair of side rails, such that the springs 1114 bias the side rails to their folded position. In the illustrated embodiments, the first side rail 302 may include three springs 1114 and the second side rail 304 may include three springs 1114. The number of springs, however, may vary in other embodiments, and the present disclosure is not intended to be limited to any number of springs. During operation, however, the springs 1114 on each side rail may be compressed as the pair of side rails move from their folded position to their raised position. Likewise, the springs 1114 may be decompressed when the pair of side rails move from their raised position to their folded position. In the raised position, the pair of side rails may extend substantially perpendicular to the top surface of the ramp 300, and offers security and guidance to the wheels of a wheelchair as it is rolled up or down the ramp 300.

In the stowed position of FIGS. 2 and 3, the ramp 300 is disposed within the compartment 214 as described above. The first and second support rollers 908, 912 may be in contact with the first track member 1102 and second track member 1104, respectively. In addition, the first centering roller 910 and second centering roller 914 may contact the first and second track members, respectively, as well. The track members may include a groove through which either the support rollers or centering rollers are disposed. The centering rollers may keep the ramp 300 aligned as it moves between the stowed and deployed positions. Moreover, as the ramp 300 is moved between these two positions, the support rollers may roll along the track members and/or bottom surface 1100 of the ramp 300.

Further, and as illustrated in FIGS. 11A and C, the pair of cam arms may be disposed in a substantially horizontal orientation. In particular, the pair of cam arms, or their respective cam wheel, may contact the spacer plates of the ramp guide assembly, as described above. The spacer plates keep or maintain the orientation of the cam arms as the ramp is moved to and from its stowed position.

When the ramp 300, however, is moved from its stowed position to its fully deployed position, the cam wheels 1110, 1112 may come into contact with the tapered edges of the respective guide blocks 706, 708. As the cam wheels 1110, 1112 come into contact with the first guide block 706 and second guide block 708, respectively, the cam arms are forced inwardly as shown in FIGS. 11B and 11D. As such, the springs 1114 are compressed, and the pair of side rails begin to raise from their folded positions. Once the pair of side rails reach their fully raised position, the ramp 300 may be in its fully deployed position 600. In this position, the cam wheels 1110, 1112 may be in engagement with the tapered edges or the third straight edge 920 of the respective guide blocks 706, 708.

With the ramp 300 in its deployed position 600, a user may lift the ramp 300 via the handle opening 306 and/or manual deployment device 216. As the ramp 300 is lifted from the ground, it is able to pivot with respect to the hinge plate 510. Moreover, the ramp 300 may be slid or moved back into the compartment 214 to its stowed position. As the ramp 300 is moved back into the compartment 214, the cam wheels 1110, 1112 may engage the tapered edges 900, 904 of the first and second guide blocks 706, 708, respectively. As the wheels roll along the tapered edges, the cam arms 1106, 1108 may extend outward and the springs 1114 decompress to urge the side rails 302, 304 from the raised position to their folded position.

Figure 14:
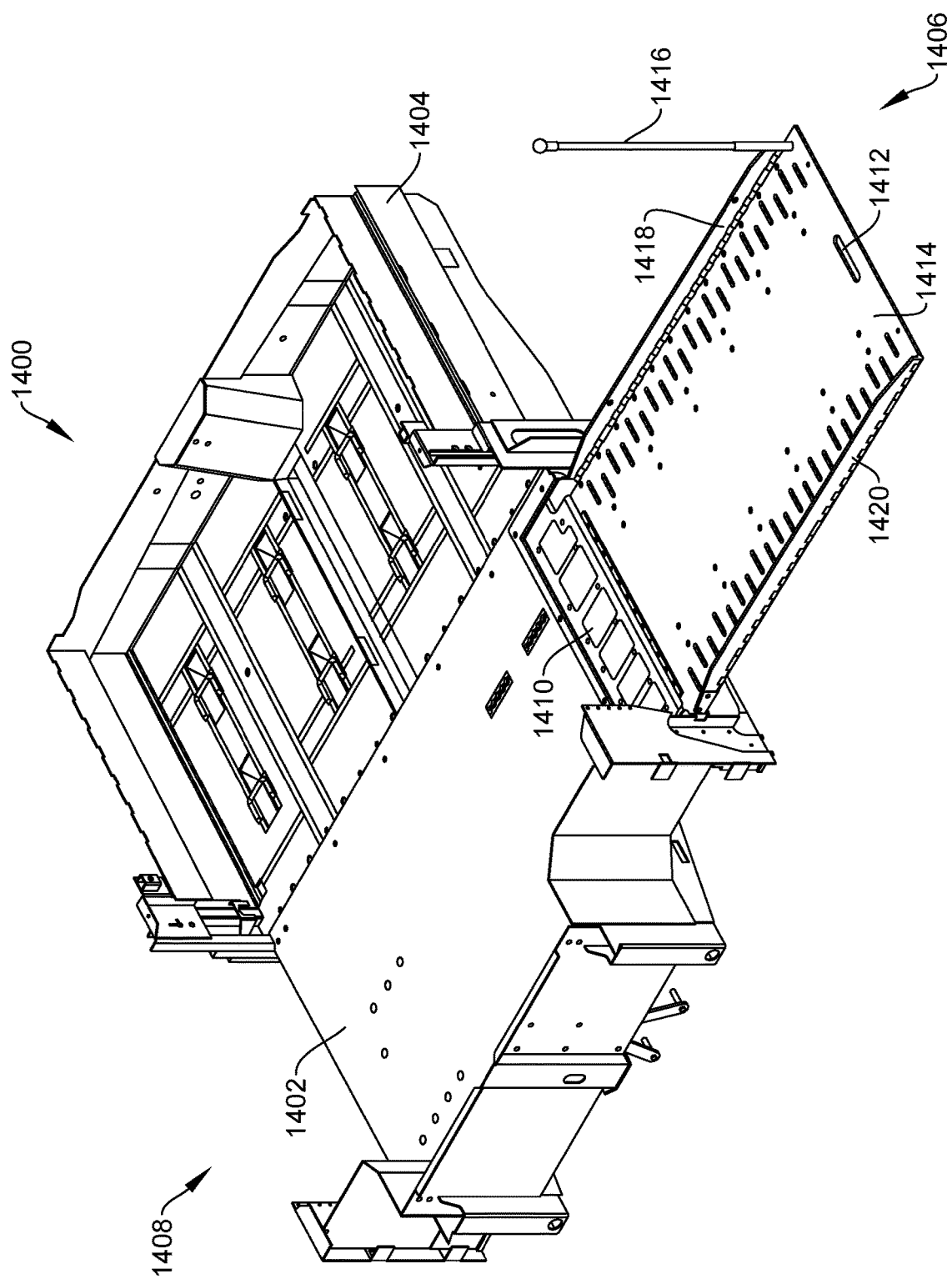
FIG. 14 is a perspective view of another embodiment of a ramp assembly disposed in its deployed position.

Referring to FIG. 14, another embodiment of a ramp assembly 1400 is shown. Here, the ramp assembly 1400 is disposed in its deployed position where it is pulled out from a compartment defined by a portion of the vehicle chassis 1404 and a cover 1402. As shown, a portion of the vehicle chassis and floor structure 1404 of a vehicle similar to the one in FIG. 1 is provided. This chassis and floor structure 1404 may be located at a side entry location of the vehicle such as the one shown in FIG. 1, or it may be at a different location (e.g., a rear location of the vehicle).

As described above with respect to FIG. 2, the chassis and floor structure 1404 may include the cover 1402 as shown. The cover 1402 may be part of a sub-floor of the actual vehicle floor. In any event, the cover 1402 may span an entire width of the vehicle floor 124, or it may only span a portion of the width. In other words, the cover 1402 may extend from a first side 1406 of the vehicle to a second side 1408 thereof. The first side 1406 may represent an exterior or entry/exit side of the vehicle that corresponds with the opening 112 of FIG. 1. The second side 1408 may represent an interior location of the vehicle, or it may represent a rear passenger door on the opposite side of the vehicle.

A transition plate 1410 may be provided in the embodiment of FIG. 14. The transition plate 1410 provides a surface upon which a wheel-chaired passenger may roll over as it transitions from either a ramp 1414 or the vehicle floor (depending upon egress or ingress of the passenger). The transition plate 1410 extends from an end of the cover 1402 to an opening formed by the door frame of the vehicle. The transition plate 1410 may be fastened or coupled to the vehicle chassis or floor structure 1404 in any known manner.

The cover 1402 and transition plate 1410 may form an upper portion of a compartment defined in the vehicle floor structure or chassis 1402, such that the ramp 1414 may be disposed within the compartment in its stowed or retracted position (not shown). To maneuver the ramp 1414 from its stowed position, a manual deployment device, stick, or handle rod 1416 may be provided. The deployment device 1416 may include an elongated rod that is coupled to the ramp 1414. The deployment device 1416 may be removably coupled to the ramp 1414, as will be described in further detail below.

The ramp 1414 may also include a handle 1412 formed by an opening in the ramp body. A user may grasp the handle 1412 and pull the ramp 1414 from its stowed position. The user may pull the ramp 1414 and move it to its deployed position of FIG. 14, or only so far until the deployment device 1416 may be used to move the ramp to its deployed position. Thus, use of the deployment device 1416 and handle 1412 may be used independently of one another or together when maneuvering the ramp 1414 between its stowed and deployed positions.

In at least one embodiment, the manual deployment device 1416 may be fixedly attached to the ramp assembly 1400 such that it is not removable. In this embodiment, the manual deployment device 1416 may be able to fold downwardly to collapse into a stowed position. Alternatively, the device 216 may be telescopically collapsed in a stored position.

Figure 15:
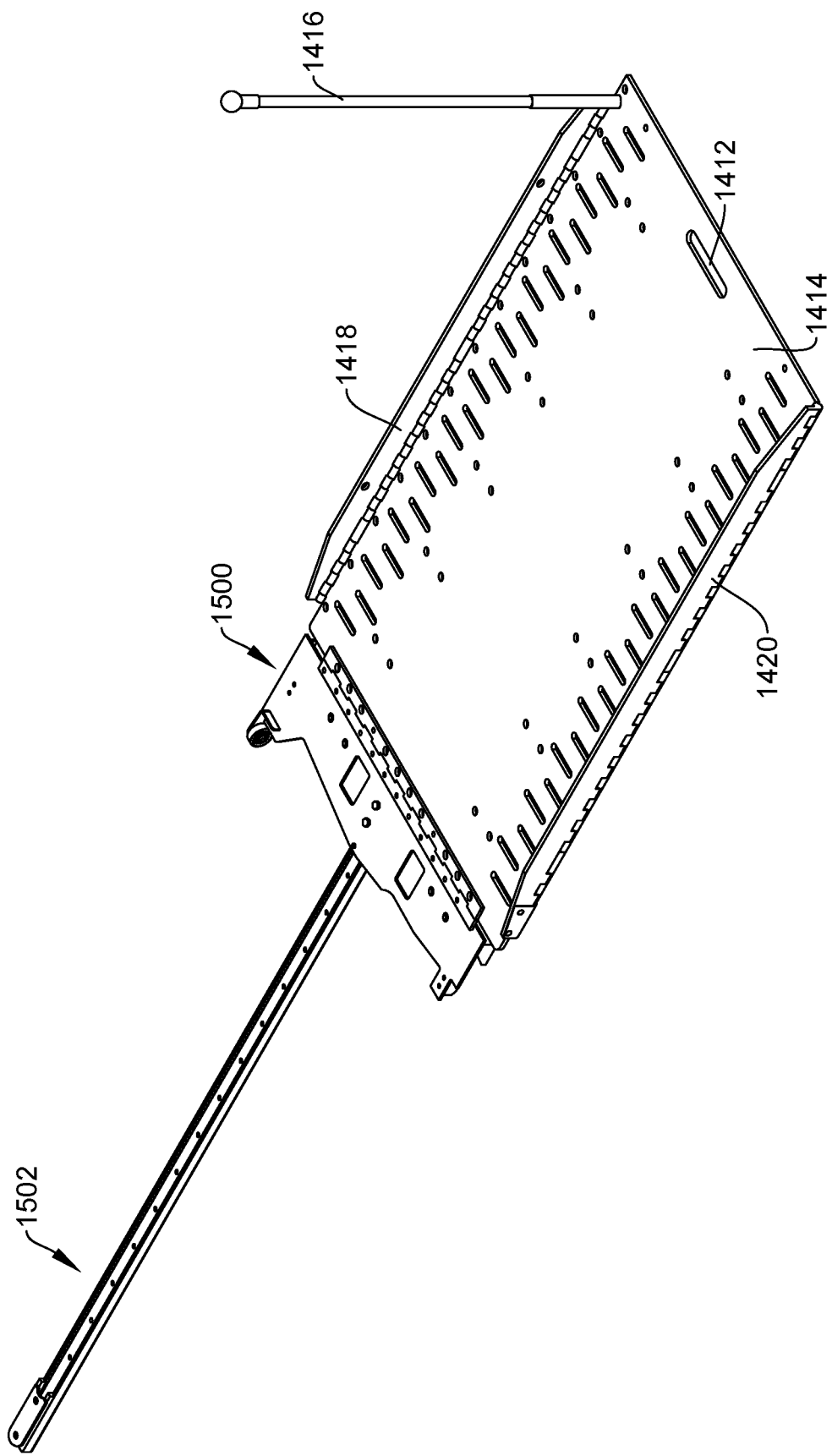
FIG. 15 is a perspective view of portions of a ramp, carriage assembly, and track assembly of the ramp assembly of FIG. 14.
Figure 22:
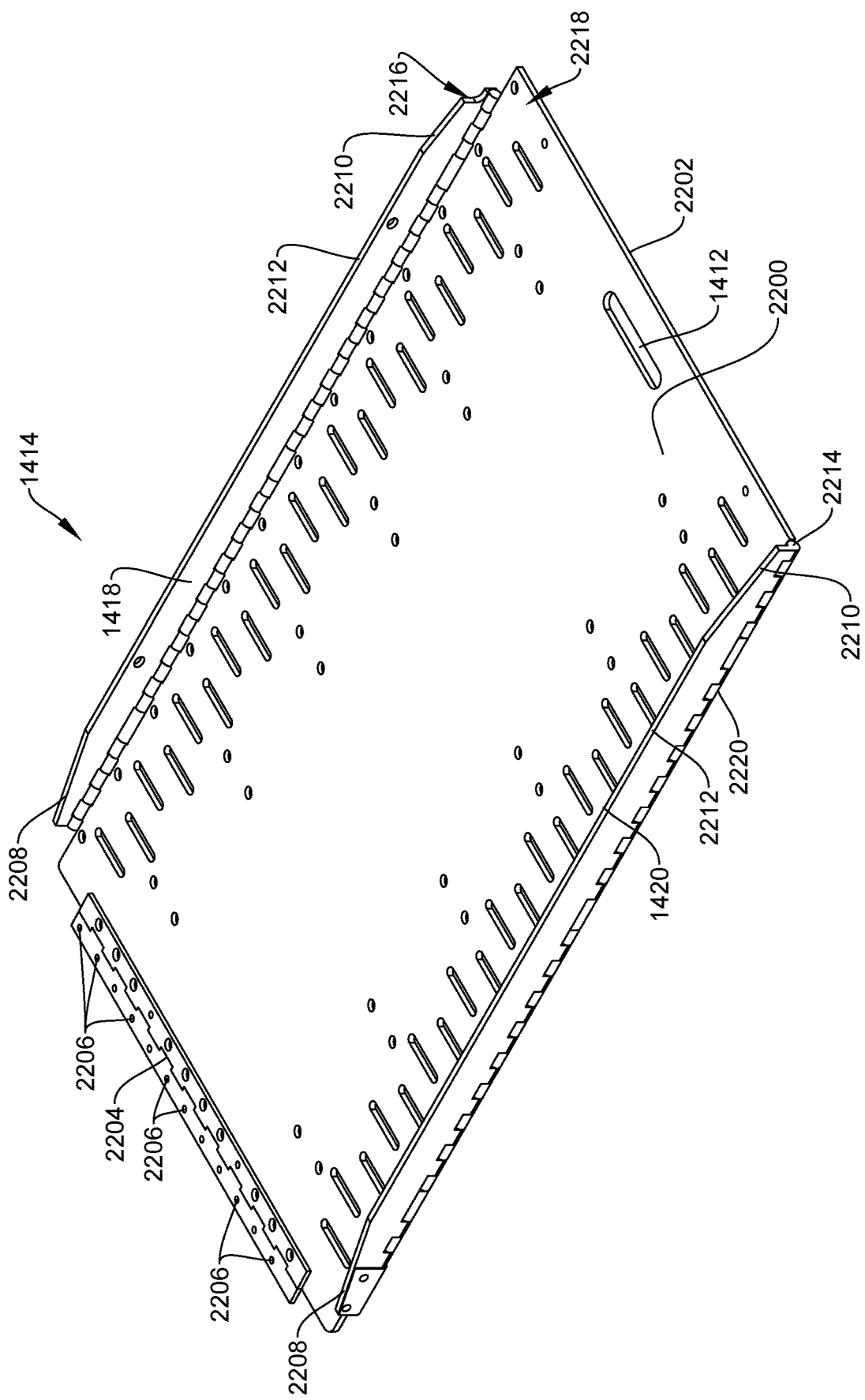
FIG. 22 is a perspective view of the ramp.

Referring to FIGS. 14-15 and 22, the ramp 1414 may include a first side rail 1418 and a second side rail 1420. The first and second side rails 1418, 1420 may be pivotably coupled to the ramp 1414 such that each pivots between a folded position and an unfolded position. Both side rails are shown in their unfolded positions in FIGS. 14-15 and 22.

The ramp 1414 includes a ramp surface 2200, which as shown in FIG. 22, is the uppermost surface upon which a wheelchair engages during ingress and egress. The handle 1412 is disposed near a ramp end 2202 and a hinge plate 2204 is located at an opposite end thereof. The ramp surface 2200 is defined along a plane. When the side rails are disposed in their unfolded position, the side rails are oriented substantially perpendicular to the ramp surface 2200. In this way, the side rails 1418, 1420 protrude upwardly and help maintain the wheelchair on the ramp 1414 as it moves therealong.

In FIG. 22, each side rail includes a defined profile. Here, the side rail has a first tapered edge 2208 and a second tapered edge 2210. A substantially straight edge 2212 is defined between the first tapered edge 2208 and the second tapered edge 2210, as shown. Moreover, the first and second side rails may be pivotably coupled to the ramp 1414 via hinges 2220. The hinges 2220 may extend the entire or substantially the entire length of each side rail. As such, the side rail pivots along its entire length between its folded and unfolded positions.

The ramp surface 2200 may further define an opening 2218 in which the deployment device 1416 may be coupled to the ramp 1414. This is best shown in FIG. 22. Further, the opening 2218 is defined nearest the first side rail 1418. As such, it is shown in FIG. 22 that the first side rail 1418 has a shorter overall length than the second side rail 1420 in order to accommodate the deployment device 1416. Moreover, the first side rail 1418 has a longer edge 2216 due to its shorter overall length, whereas the second side rail 1420 has a shorter edge 2214 due to its longer overall length.

It is further noted that neither the first side rail 1418 or second side rail 1420 include a defined gap or slot 1006 and end portion 1008 similar to the ramp assembly shown in FIG. 10. Instead, the first side rail 1418 in particular has a shorter overall length to accommodate the deployment device 1416.

In FIG. 15, the ramp assembly 1400 is shown including a carriage assembly 1500 and a track assembly 1502. These two assemblies will now be described.

Figure 16:
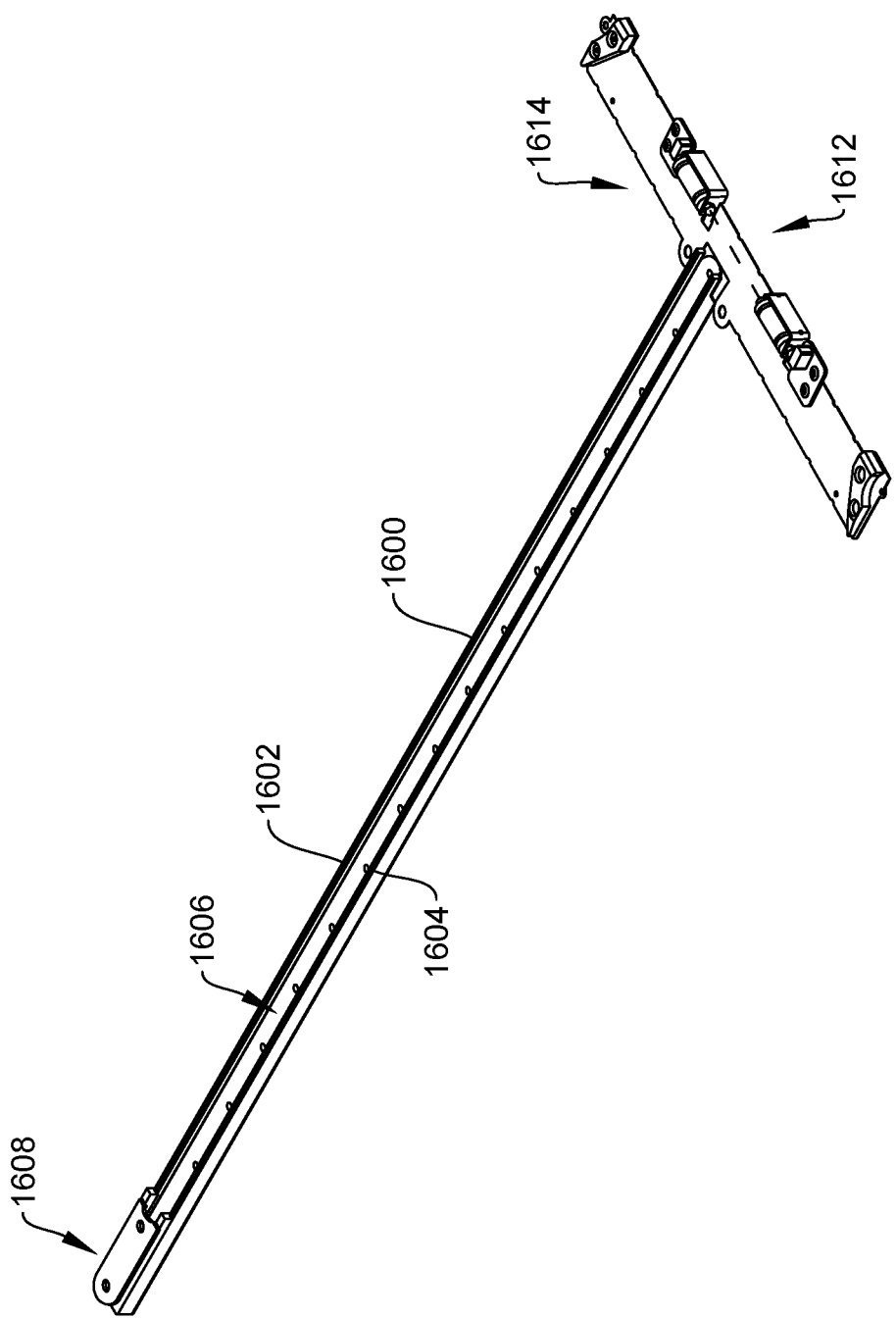
FIG. 16 is a perspective view of the track assembly of FIG. 15.

In FIG. 16, the track assembly 1502 is shown including an elongated guide track 1600 formed by a first edge 1602, a second edge 1604, and a channel 1606 formed therebetween. The length of the channel 1606 partly defines the length or amount of travel of the ramp 1414 between its stowed and deployed positions. The carriage assembly 1500, which is connected to the ramp 1414, travels along the channel 1606 as the ramp assembly 1400 moves between its stowed position and its deployed position.

In the stowed position, the guide assembly 1500 may come into contact with a stopper assembly 1608 at a first end of the track assembly 1502. A guide assembly 1614 is located at a second end 1612 of the track assembly 1502. The guide assembly 1614, as will be described in further detail below, assists with controlling the pivotal movement of the side rails 1418, 1420.

Figure 17:
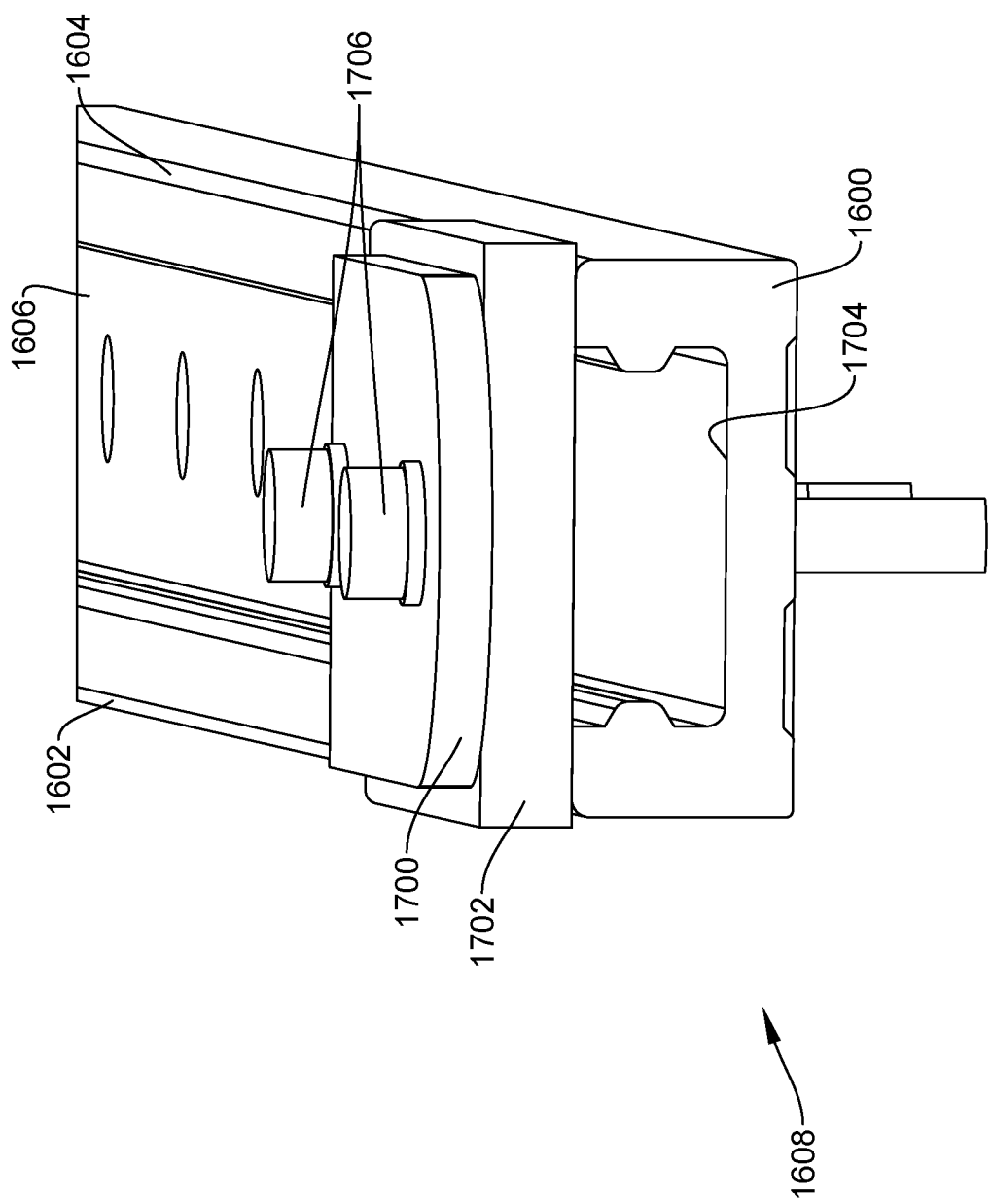
FIG. 17 is a partial cross-sectional and perspective view of one end of the track assembly of FIG. 15.

With respect to FIG. 17, the stopper assembly 1608 is shown in greater detail. Here, the stopper assembly 1608 may include an upper member 1700 formed of a steel, aluminum or other metal. A stop member 1702 may be disposed below the upper 1700. The stop member 1702 may be formed of a plastic or other material. For instance, it may be possible for the stop member 1702 to be formed of an elastic or foam material. The carriage assembly 1500 and/or ramp 1414 may contact the stop member 1702 and/or upper member 1700 in the stowed position. A lower member 1704 may be located within the channel 1606 and below the upper member 1700 and stop member 1702. The lower member 1704 may be formed of a plastic or other material. In one embodiment, the lower member 1704 may be the same material as the stopper member 1702. In a different embodiment, the stopper member 1702 and lower member 1704 may be formed of a different material.

The stopper assembly 1608 may also include one or more fasteners 1706 for securing the upper member 1700, the stopper member 1702, and the lower member 1704 to one another. Moreover, the fasteners 1706 may further couple the stopper assembly 1608 to the track assembly 1502.

Figure 18:
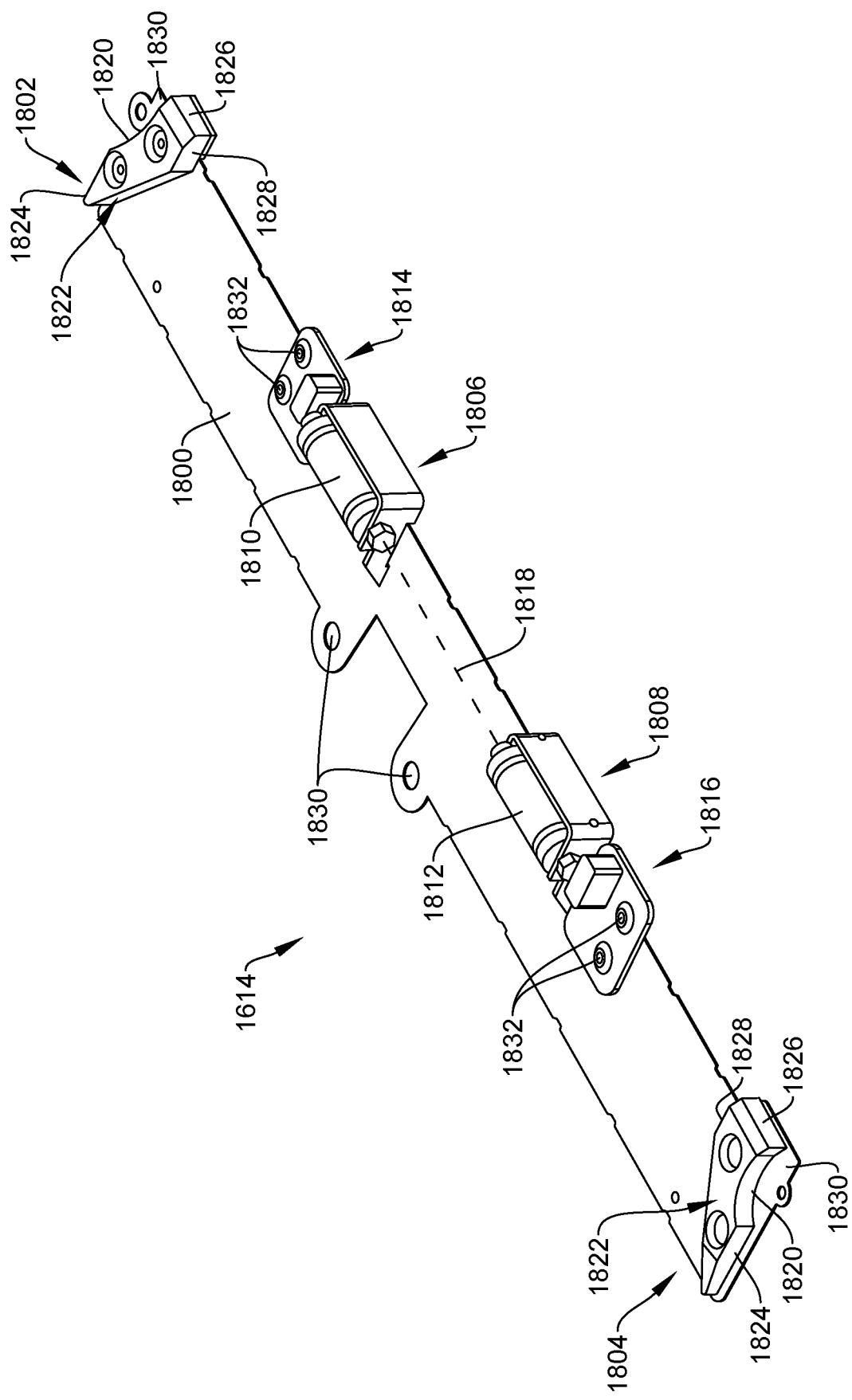
FIG. 18 is a perspective view of a guide assembly of the track assembly.
Figure 19:
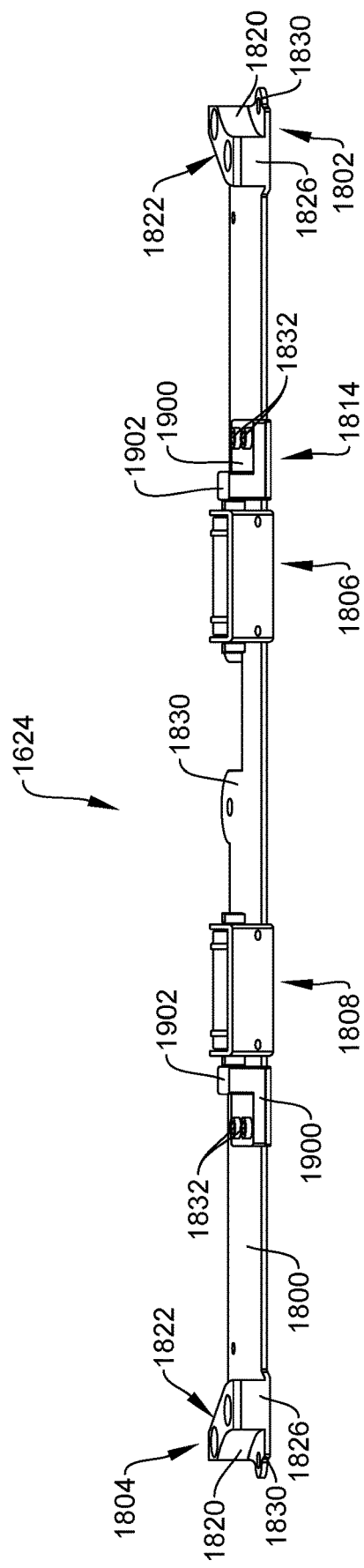
FIG. 19 is a front perspective view of the guide assembly.

Referring now to FIGS. 18 and 19, the guide assembly 1614 is shown in greater detail. The guide assembly 1614 may include an elongated plate 1800 similar to the one depicted in FIG. 9. The plate 1800 may include a plurality of ears 1830 having openings through which fasteners such as bolts may connect the guide assembly to the vehicle floor or chassis. Others types of fasteners or means for securing the guide assembly 1614 to the vehicle may be used.

The guide assembly 1614 may also include a first guide member 1802 and a second guide member 1804. The first and second guide members may include shapes designated to assist with the raising and lowering of the side rails 1418, 1420. Each guide member is formed by a body having a scalloped edge 1820, a tapered edge 1822, a first straight edge 1824, a second straight edge 1826, and a third straight edge 1828. The straight edges may instead be curved, or in other embodiments there may be additional edges. As will be described below, the tapered edges 1822 on both the first and second guide members may contact the ramp 1414 as the ramp is moved from its stowed position to its deployed position in order to raise the side rails.

The guide members 1802, 1804 may include openings through which one or more fasteners may couple the respective guide rail to the plate 1800 and vehicle floor or chassis. Alternatively, the guide members 1802, 1804 may be adhered, welded, or coupled in another way to the plate 1800.

The guide assembly 1614 may also include a first roller assembly 1806 and a second roller assembly 1808. The first roller assembly 1806 may include a first roller 1810 that rotates about a rotation axis 1818. Likewise, the second roller assembly 1808 may include a second roller 1812 that rotates about the same rotation axis 1818. Thus, the first and second roller assemblies 1806, 1808 may be axially aligned along the rotation axis 1818. The bottom surface of the ramp 1414 may contact the roller assemblies as its moves between its stowed and deployed positions, and the rollers may rotate in either direction to assist with the movement of the ramp during its transition.

The guide assembly 1614 may further include a first centering block 1814 and a second centering block 1816. The centering blocks may assist with keeping the ramp 1414 centered as it moves between the stowed and deployed positions. As best shown in FIG. 19, each centering block includes a base portion 1900 and a raised portion 1902. The base portion 1900 may include one or more apertures through which fasteners 1832 may couple the blocks to the plate 1800.

Figure 20:
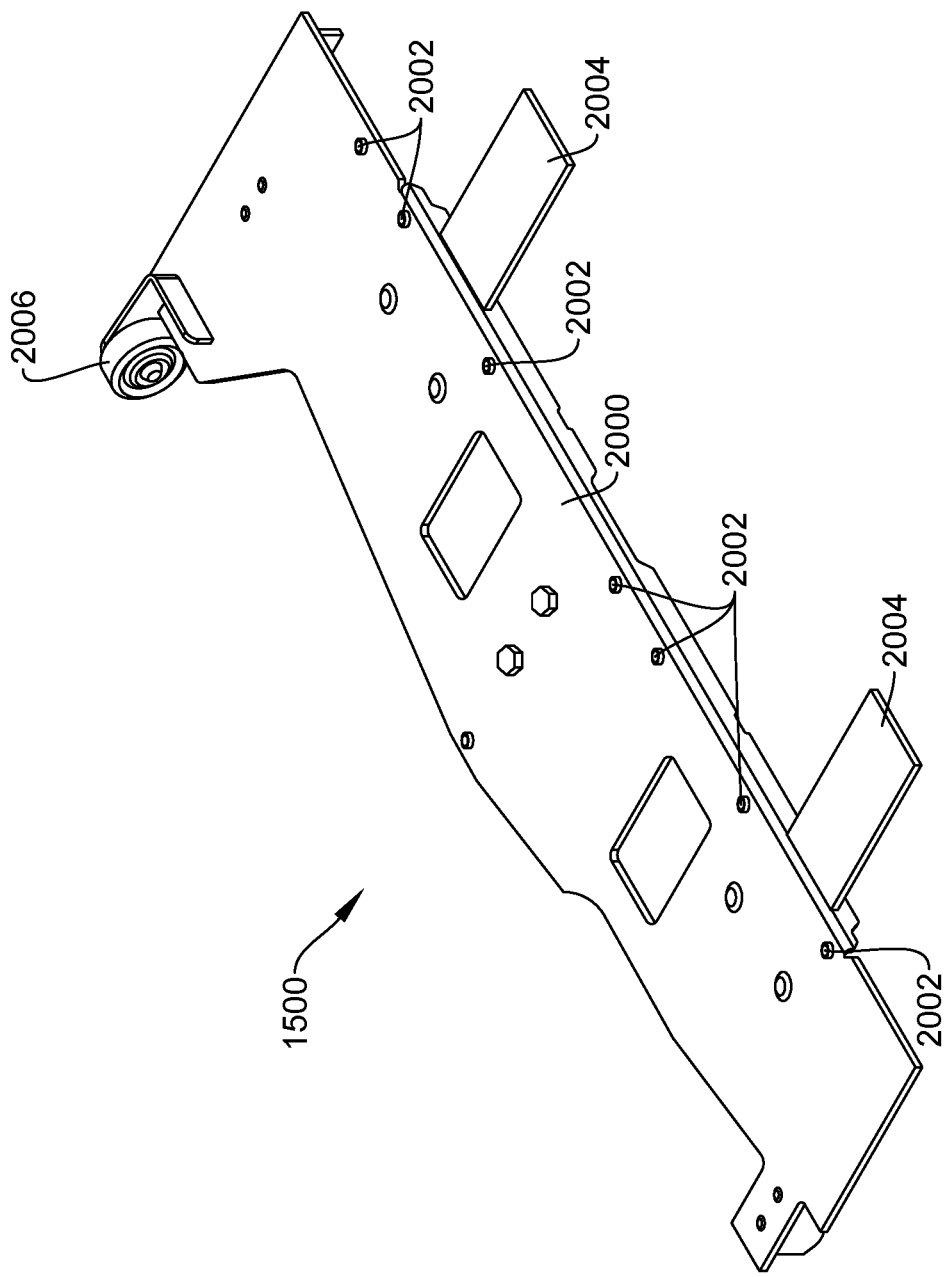
FIG. 20 is a perspective view of the carriage assembly of FIG. 15.
Figure 21:
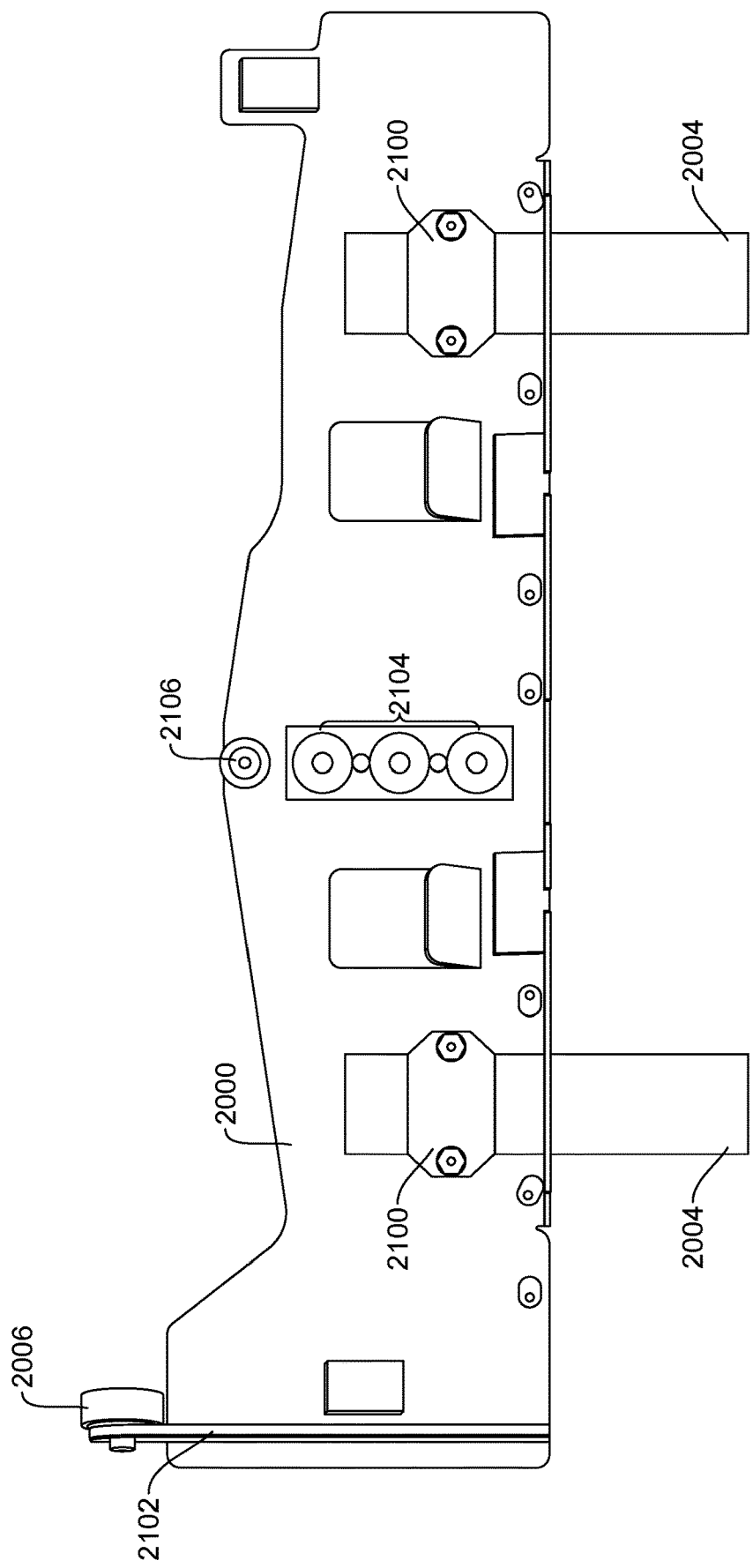
FIG. 21 is a bottom view of the carriage assembly.

In FIGS. 20-21, an embodiment of the carriage assembly 1500 is shown in detail. Here, the carriage assembly 1500 includes a carriage body 2000. The carriage body 2000 defines a plurality of mounting holes 2002 which may align with the plurality of mounting holes 2206 on the hinge plate 2204. Thus, the carriage assembly 1500 may be coupled to the hinge plate 2204, and thus the ramp 1414, by fasteners (not shown). The carriage assembly 1500 may further include one or more leaf spring assemblies 2004. Each leaf spring assembly 2004 may include a plurality of leaf springs. The leaf spring assemblies 2004 may contact an underneath surface of the ramp 1414.

The carriage assembly 1500 may further include a wheel assembly 2006 that is coupled to a top surface thereof. The wheel assembly 2006 may include a wheel that rotates in contact with an underside of the vehicle floor during transition of the ramp 1414 between its stowed and deployed positions. As shown in FIG. 21, the wheel assembly 2006 may be coupled via an arm support 2102 to the carriage body 2000. The support arm 2102 may be welded, adhered, mechanically fastened, integrally formed with, or coupled to the carriage body 2000 in any other known manner.

It is further shown in FIG. 21 that the leaf spring assemblies 2004 may be coupled to the carriage body 2000 via mounting plates 2100. The mounting plates 2100 may be coupled via fasteners or the like to an underside surface of the carriage assembly 1500.

The carriage assembly 1500 may also include a plurality of track wheels 2104 and a center wheel 2106, as also shown in FIG. 21. The center wheel 2106 and plurality of track wheels 2104 may slide or rotate within the channel 1606 of the guide track 1600. As the center wheel 2106 and plurality of track wheels 2104 are disposed in the channel 1606, the carriage assembly 1500 and ramp 1414 remain substantially positioned along a longitudinal axis defined by the guide track 1600.

Figure 23:
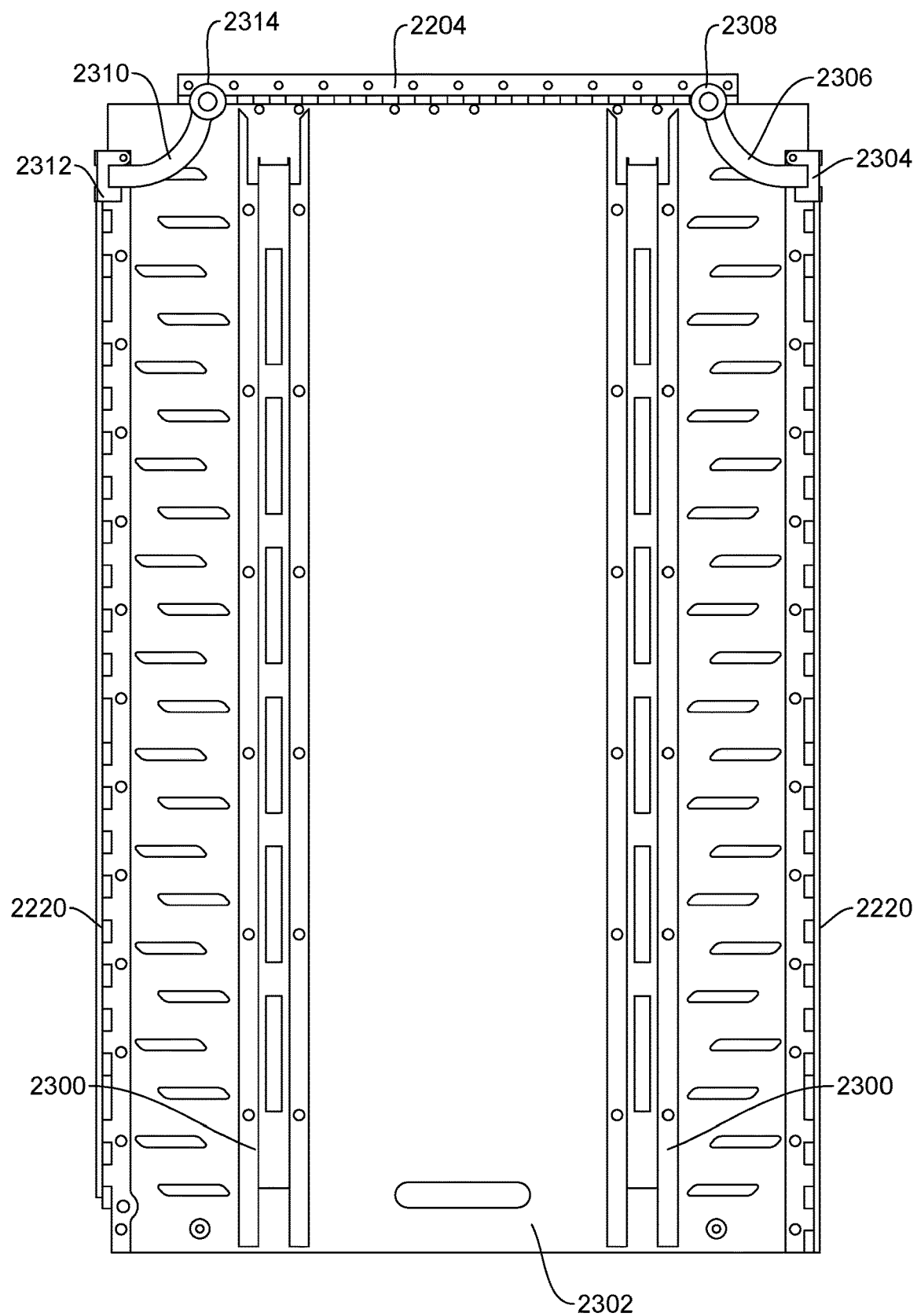
FIG. 23 is a bottom view of the ramp.

Referring now to FIG. 23, the underside of the ramp 1414 is shown in greater detail. Here, the ramp 1414 includes a bottom surface 2302. One or more stiffener ribs 2300 may be coupled or welded to the bottom surface 2302 to improve the rigidity and durability of the ramp 1414. The stiffener ribs may extend towards the hinge plate 2204 and be aligned with the leaf spring assemblies 2004. In at least one example, the stiffener ribs 2300 may capture or at least partially cover the leaf spring assemblies 2004 on the carriage assembly 1500 in order to reduce the ability or likelihood of the ramp 1414 lifting or raising above the horizontal plane defined by the ramp 1414 itself.

As described above, the first side rail 1418 and second side rail 1420 may pivot between a folded position and an unfolded position. In the folded position, the ramp assembly 1400 is in its stowed position, or at least partially stowed. In the unfolded position, the ramp assembly 1400 may be in its deployed position or is in transition to or from its deployed position.

In order to move the side rails between their folded and unfolded positions, the ramp assembly 1400 may include a first arm 2306 and a second arm 2310 pivotally coupled to the ramp 1414. Here, the first arm 2306 is coupled at one end to the ramp 1414 and second side rail 1420 via a first pivot mounting 2304. The first arm 2306 may be coupled to a first roller wheel 2308 at its second end. Likewise, the second arm 2310 is coupled at one end to the ramp 1414 and the first side rail 1418 via a second pivot mounting 2312. The second arm is further coupled to a second roller wheel 2314 at its second end, as shown in FIG. 23.

During operation, the ramp assembly 1400 may be disposed in its stowed position. When it is desired to move the ramp assembly 1400 to its deployed position, a user may pull the ramp 1414 via its handle 1412 until either the deployment device 1416 may be inserted into the opening 2218 or until the ramp assembly 1400 reaches its deployed position. The deployment device 1416 may simply be a tool to assist with moving the ramp assembly 1400 between its stowed and deployed positions.

As the ramp assembly 1400 transitions to its deployed position, the ramp 1414 and carriage assembly 1500 move along the guide track 1600. In particular, the center wheel 2106 and plurality of track wheels 2104 may slide or rotate within the channel 1606 of the guide track 1600. As the ramp 1414 transitions out of the compartment of the vehicle, it may begin to pivot downwardly via its hinge plate 2204.

Moreover, as the ramp 1414 is moved to its deployed position, the first roller wheel 2308 and second roller wheel 2314 may engage the tapered edges 1822 of the first guide member 1802 and second guide member 1804. As the roller wheels engage the tapered edges 1822, the first arm 2306 and the second arm 2310 may move outwardly and induce a pivotal movement about the respective pivot mountings 2304, 2314. As such, the first side rail 1814 and second side rail 1820 may pivot from their folded position to their upright, unfolded position (see FIGS. 14 and 22). The ramp 1414 may reach its deployed position as the ramp end 2202 engages the ground or other surface.

In this position, the manual deployment device 1416 may be decoupled from the ramp 1414 and a user may maneuver a wheelchair along the ramp to enter or exit the vehicle. It is further noted that the carriage assembly 1500 may be disposed near the door opening of the vehicle, and the ramp 1414 is positioned at an angle with respect to the carriage body 2000 and plate 1800 of the guide assembly 1614. The ramp 1414 is able to be disposed in this position due to the pivotal nature of the hinge plate 2204.

When returning or moving the ramp assembly 1400 to its stowed position from its deployed position, the manual deployment device 1416 may be coupled to the ramp 1414. The ramp 1414 may then be lifted and pivoted about its hinge plate 2204 and slid back into the vehicle compartment. As it does, the carriage assembly 1500 may slide along the guide track 1600. Moreover, the roller wheels may disengage from the tapered edges 1822 of the first and second guide members 1802, 1804, thereby inducing the first and second side rails to collapse to their folded positions.

The ramp 1414 may reach its stowed position once the carriage assembly 1500 and/or ramp 1414 come into close proximity or contact the stopper assembly 1608. In some instances, the stopper assembly 1608 may be engaged in the stowed position, and in other instances there may be a gap between the stopper assembly 1608 and the carriage assembly 1500 and/or ramp 1414.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A ramp assembly for use to accommodate a wheelchaired passenger to enter or exit a motorized vehicle, comprising:
   a ramp body having a length defined along a longitudinal direction, the ramp body including a first side, a second side, a first end and a second end;
   a first side rail pivotably coupled to the ramp body along the first side;
   a second side rail pivotably coupled to the ramp body along the second side;
   a hinge plate pivotably coupled to the ramp body at the first end;
   a first arm coupled to a bottom surface of the ramp body, the first arm including a first roller wheel; and
   a second arm coupled to the bottom surface of the ramp body, the second arm including a second roller wheel;
   wherein, the first side rail and second side rail are pivotably moved between a folded position in which the first and second side rails pivot inwardly and a raised position in which the side rails are oriented perpendicular to the ramp body;
   wherein, the first arm operably pivots the first side rail between its folded and raised position, and the second arm operably pivots the second side rail between its folded and raised position;
   further wherein, the ramp body moves between a stowed position and a deployed position, the first and second side rails being in their folded position when the ramp is in its stowed position and in their raised position when the ramp is in its deployed position.

2. The ramp assembly of claim 1, further comprising:
   a carriage assembly coupled to the hinge plate; and
   a track assembly including a guide track defining a longitudinal channel along which the carriage assembly moves as the ramp is moved between its stowed and deployed positions.

3. The ramp assembly of claim 2, wherein the track assembly comprises a guide assembly at one end of the guide track and a stopper assembly at an opposite end thereof.

4. The ramp assembly of claim 3, wherein the stopper assembly comprises:
   an upper member;
   a lower member disposed within the channel of the guide track; and
   a stop member located between the upper member and the lower member;
   wherein, the upper member, lower member, and stop member are coupled to one another and the guide track.

5. The ramp assembly of claim 4, wherein the upper member comprises a type of material different from the lower member and stop member.

6. The ramp assembly of claim 3, wherein the guide assembly comprises:
   a base plate configured to being coupled to a floor of the vehicle;
   a guide member having a tapered edge and being coupled to the base plate;
   a roller assembly coupled to the base plate and comprising a roller configured to rotate about a rotation axis, the rotation axis being substantially perpendicular to the longitudinal direction; and
   a centering block coupled to the base plate;
   wherein, as the ramp body moves between the stowed position and deployed positions, at least one of the first and second roller wheel engages the tapered edge of the guide member to induce pivotal movement of the corresponding first or second side rail between their folded and raised positions.

7. The ramp assembly of claim 6, further comprising a second guide member having a tapered edge and being coupled to the base plate at a side opposite the first guide member;
   wherein, the other of the first and second roller wheel engages the tapered edge of the second guide member to induce pivotal movement of the corresponding first or second side rail between their folded and raised positions.

8. The ramp assembly of claim 6, wherein the centering block comprises a base portion and a raised portion, the base portion being coupled to the base plate.

9. The ramp assembly of claim 2, wherein the carriage assembly comprises:
   a carriage body;
   a wheel;
   a mounting arm for coupling the wheel to the carriage body; and
   one or more track wheels and a center wheel;
   wherein, as the carriage assembly moves along the guide track, the one or more track wheels and center wheel move within the longitudinal channel.

10. The ramp assembly of claim 1, wherein the ramp body comprises an opening formed therein for receiving a manual deployment device, the opening being formed near the second end and in close proximity to the first or second side rail.

11. The ramp assembly of claim 1, further comprising at least one stiffener rib coupled to the bottom surface of the ramp body, the at least one stiffener rib extending in the longitudinal direction from the first end to the second end of the ramp body.

12. A ramp assembly for use to accommodate a wheel-chaired passenger to enter or exit a motorized vehicle, comprising:
a ramp body configured to be movable between a stowed position and a deployed position;
a first side rail pivotably coupled to the ramp body along a first side;
a second side rail pivotably coupled to the ramp body along a second side;
a first arm coupled to a bottom surface of the ramp body, the first arm including a first cam wheel;
a second arm coupled to the bottom surface of the ramp body, the second arm including a second cam wheel; and
a manual deployment device coupled to the ramp body, the manual deployment device comprising a coupler end for coupling to the ramp body, a flexible cable, an outer tube surrounding the cable, and a handle for maneuvering the ramp body;
wherein, as the ramp body is moved between its stowed position and deployed position, the first side rail and second side rail are pivotably moved between a folded position in which the side rails pivot inwardly and a raised position in which the side rails are oriented perpendicular to the ramp body and wherein, the first arm operably pivots the first side rail between its folded and raised position, and the second arm operably pivots the second side rail between its folded and raised position.

13. The ramp assembly of claim 1, further comprising:
a carriage assembly coupled to the ramp body; and
a track assembly including a longitudinal channel along which the carriage assembly moves as the ramp is moved between its stowed and deployed positions.

14. The ramp assembly of claim 13, wherein the track assembly comprises a guide assembly at one end of the channel and a stopper assembly at an opposite end thereof.

15. The ramp assembly of claim 14, wherein:
the first arm is coupled to the first side rail to induce movement of the first side rail between its folded and raised positions as the first wheel engages the guide assembly; and
the second arm is coupled to the second side rail to induce movement of the second side rail between its folded and raised positions as the second wheel engages the guide assembly.

16. A motorized vehicle, comprising:
a chassis;
a floor structure formed in the chassis, the floor structure defining an inner compartment;
a ramp assembly movable between a stowed position in which the ramp assembly is located in the compartment and a deployed position, the ramp assembly comprising a ramp body, a first side rail pivotably coupled to the ramp body along a first side, a second side rail pivotably coupled to the ramp body along a second side, a hinge plate pivotably coupled to the ramp body, a first arm coupled to a bottom surface of the ramp body, the first arm including a first roller wheel, and a second arm coupled to the bottom surface of the ramp body, the second arm including a second roller wheel;
wherein, the first side rail and second side rail are pivotably moved between a folded position in which the side rails pivot inwardly, and a raised position in which the side rails are oriented perpendicular to the ramp body;
further wherein, the first arm operably pivots the first side rail between its folded and raised position, and the second arm operably pivots the second side rail between its folded and raised position.

17. The vehicle of claim 16, further comprising:
a carriage assembly coupled to the hinge plate; and
a track assembly including a guide track defining a longitudinal channel along which the carriage assembly moves as the ramp is moved between its stowed and deployed positions.

18. The vehicle of claim 17, further comprising a guide assembly coupled to the track assembly, the guide assembly comprising:
a base plate configured to being coupled to the floor structure;
a guide member having a tapered edge and being coupled to the base plate;
a roller assembly coupled to the base plate and comprising a roller configured to rotate about a rotation axis, the rotation axis being substantially perpendicular to the longitudinal direction; and
a centering block coupled to the base plate;
wherein, as the ramp body moves between the stowed position and deployed positions, at least one of the first and second roller wheel engages the tapered edge of the guide member to induce pivotal movement of the corresponding first or second side rail between their folded and raised positions.

19. The vehicle of claim 17, wherein the carriage assembly comprises:
a carriage body;
a wheel;
a mounting arm for coupling the wheel to the carriage body; and
one or more track wheels and a center wheel;
wherein, as the carriage assembly moves along the guide track, the one or more track wheels and center wheel move within the longitudinal channel.

* * * * *